United States Patent
Tojo et al.

(10) Patent No.: US 11,319,436 B2
(45) Date of Patent: *May 3, 2022

(54) THERMOPLASTIC POLYESTER RESIN COMPOSITION AND MOLDED ARTICLE

(71) Applicant: Toray Industries, Inc., Tokyo (JP)

(72) Inventors: Yusuke Tojo, Nagoya (JP); Kentaro Togawa, Nagoya (JP); Daisuke Sato, Ichihara (JP); Sadanori Kumazawa, Otsu (JP)

(73) Assignee: Toray Industries, Inc., Tokyo (JP)

( * ) Notice: Subject to any disclaimer, the term of this patent is extended or adjusted under 35 U.S.C. 154(b) by 545 days.

This patent is subject to a terminal disclaimer.

(21) Appl. No.: 15/035,303

(22) PCT Filed: Sep. 4, 2014

(86) PCT No.: PCT/JP2014/073326
§ 371 (c)(1),
(2) Date: May 9, 2016

(87) PCT Pub. No.: WO2015/072216
PCT Pub. Date: May 21, 2015

(65) Prior Publication Data
US 2016/0289445 A1      Oct. 6, 2016

(30) Foreign Application Priority Data

Nov. 18, 2013  (JP) .............................. JP2013-237704
May 9, 2014  (JP) .............................. JP2014-097274

(51) Int. Cl.
| | | |
|---|---|---|
| C08L 67/02 | (2006.01) | |
| C08G 59/32 | (2006.01) | |
| C08G 59/68 | (2006.01) | |
| C08K 5/49 | (2006.01) | |
| C08L 63/00 | (2006.01) | |
| C08L 63/04 | (2006.01) | |
| C08G 59/06 | (2006.01) | |
| C08G 63/82 | (2006.01) | |

(52) U.S. Cl.
CPC .......... *C08L 67/02* (2013.01); *C08G 59/3218* (2013.01); *C08G 59/686* (2013.01); *C08G 59/688* (2013.01); *C08K 5/49* (2013.01); *C08L 63/00* (2013.01); *C08L 63/04* (2013.01); *C08L 2201/08* (2013.01); *C08L 2205/05* (2013.01)

(58) Field of Classification Search
None
See application file for complete search history.

(56) References Cited

U.S. PATENT DOCUMENTS

| | | | |
|---|---|---|---|
| 4,683,249 A | 7/1987 | Nakatani et al. | |
| 5,037,903 A * | 8/1991 | Parker ................. | C08G 59/688 |
| | | | 525/438 |
| 6,379,799 B1 | 4/2002 | Almen | |
| 2002/0099150 A1* | 7/2002 | Kumazawa .......... | C08G 59/226 |
| | | | 525/438 |
| 2003/0135015 A1 | 7/2003 | Fujimaki et al. | |
| 2009/0275678 A1* | 11/2009 | Kumazawa ............. | C08L 67/00 |
| | | | 523/523 |
| 2010/0324174 A1 | 12/2010 | Ueda | |
| 2011/0139496 A1 | 6/2011 | Nakamura et al. | |
| 2012/0024580 A1 | 2/2012 | Hsu et al. | |
| 2012/0296011 A1* | 11/2012 | Kawai ................... | C07C 49/753 |
| | | | 523/400 |

FOREIGN PATENT DOCUMENTS

| | | | |
|---|---|---|---|
| CN | 101720339 | | 6/2010 |
| JP | 59-68367 | A | 4/1984 |
| JP | 62-16484 | A | 1/1987 |
| JP | 6-220124 | A | 8/1994 |
| JP | 6-256417 | A | 9/1994 |
| JP | 10-87959 | A | 4/1998 |
| JP | 10-324736 | A | 12/1998 |
| JP | 2002-332332 | A | 11/2002 |
| JP | 2002332332 | A * | 11/2002 |
| JP | 2003-171542 | A | 6/2003 |
| JP | 2003176399 | A * | 6/2003 |
| JP | 2003176399 | A * | 6/2003 |
| JP | 2004-269645 | A | 9/2004 |
| JP | 2004269625 | A * | 9/2004 |
| JP | 2005-105189 | A | 4/2005 |
| JP | 2005105189 | A * | 4/2005 |
| JP | 2011-52172 | A | 3/2011 |
| JP | 2012-46720 | A | 3/2012 |
| JP | 2014-196484 | A | 10/2014 |
| WO | 01/94443 | A1 | 12/2001 |

OTHER PUBLICATIONS http://www.matweb.com/index.aspx, "Huntsman Tactix XP 71756.00," accessed Sep. 28, 2018 (Year: 2018).*
Supplementary European Search Report dated Jul. 4, 2017, of corresponding European Application No. 14862282.2.
Official Action dated Sep. 30, 2020, of counterpart U.S. Appl. No. 16/781,768.

* cited by examiner

*Primary Examiner* — Randy P Gulakowski
*Assistant Examiner* — Ha S Nguyen
(74) *Attorney, Agent, or Firm* — DLA Piper LLP (US)

(57) ABSTRACT

A thermoplastic polyester resin composition has an excellent retention stability and is capable of producing a molded article excellent in mechanical properties and heat resistance as well as in long-term hydrolysis resistance; and the molded article. The thermoplastic polyester resin includes 100 parts by weight of a thermoplastic polyester resin (A) and 0.1 to 10 parts by weight of a biphenyl aralkyl-type epoxy resin or cyclopentadiene-type epoxy resin (B) of a specific type.

12 Claims, No Drawings

THERMOPLASTIC POLYESTER RESIN COMPOSITION AND MOLDED ARTICLE

TECHNICAL FIELD

This disclosure relates to a thermoplastic polyester resin composition and a molded article obtainable by molding the same.

BACKGROUND

Thermoplastic polyester resins have been used in a wide range of fields, for example, in mechanical machine parts, electric/electronic components and automotive parts, utilizing their excellent injection moldability, mechanical properties and other features. However, the thermoplastic polyester resins are susceptible to degradation by hydrolysis. Therefore, to use the thermoplastic polyester resins as industrial materials such as materials for mechanical machine parts, electric and electronic components and automotive parts, the resins are required to have a long-term hydrolysis resistance, in addition to having balanced chemical and physical properties in general. Further, with the downsizing of molded articles in recent years, there is a growing demand for thinner and lighter molded articles. In the field of thin-walled molded article applications such as connector applications, in particular, a material having an excellent retention stability in which changes in the viscosity during melt retention is small is required, because a high rate of change in the viscosity during melt retention leads to the occurrence of molding defects such as burrs and short shots during the molding.

To provide hydrolysis resistance to the thermoplastic polyester resins, a technique is known in which an epoxy resin is added to the thermoplastic polyester resin. As resin compositions obtained as described above, there have been proposed a thermoplastic composition including a thermoplastic polyester resin, an epoxy resin having an average epoxy equivalent of from 80 to 1,000, and a curing accelerator to be used for the epoxy resin (see JP 10-324736 A); and a polyester resin composition including a thermoplastic polyester resin, an aromatic vinyl resin having a weight average molecular weight of from 1,000 to 10,000, an amide compound having a molecular weight of from 1,000 or less, a polyol compound having three or more hydroxyl groups, an epoxy compound, and a fibrous filler (see JP 2011-52172 A). However, those techniques have not been sufficient to provide satisfactory hydrolysis resistance.

Further, as the resin composition including an epoxy resin, there have been proposed a flame retardant resin composition including a thermoplastic polyester resin, polyphenylene sulfide, an epoxy resin, a flame retardant, and an auxiliary flame retardant (see JP 59-68367 A); and a flame retardant resin composition including a thermoplastic resin, a phosphorus-based flame retardant, and an epoxy resin having a specific structure (see JP 2005-105189 A). However, the above mentioned inventions have been made primarily for the purpose of improving flame retardancy, and there are problems that the resin composition disclosed in JP 59-68367 A has insufficient hydrolysis resistance, and the resin composition disclosed in JP 2005-105189 A has insufficient heat resistance.

It could therefore be helpful to provide a thermoplastic polyester resin composition having an excellent retention stability and capable of producing a molded article excellent in mechanical properties and heat resistance as well as in long-term hydrolysis resistance; and the molded article.

SUMMARY

We found that by adding a specific amount of a novolac type epoxy resin (B) having a specific structure to a thermoplastic polyester resin (A), the compositions can be surprisingly improved.

We thus provide a thermoplastic polyester resin composition comprising 100 parts by weight of a thermoplastic polyester resin (A), and from 0.1 to 10 parts by weight of a novolac type epoxy resin (B) represented by formula (1);

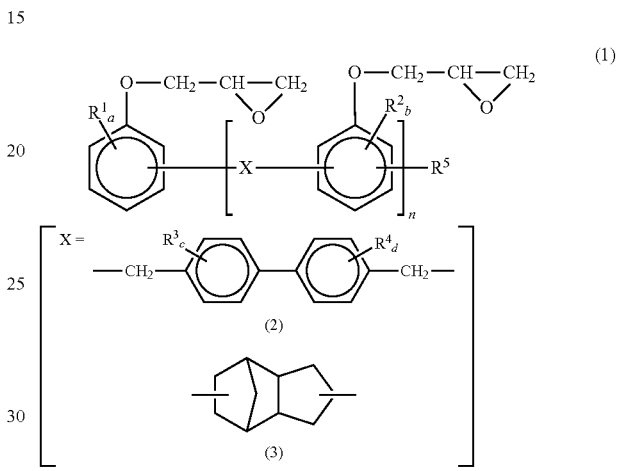

wherein in formula (1), X represents a divalent group represented by formula (2) or (3) shown above;

wherein in formulae (1) and (2), $R^1$ to $R^4$ each independently represents an alkyl group having from 1 to 8 carbon atoms or an aryl group having from 6 to 10 carbon atoms, and they may be the same or different from each other; and $R^5$ represents a hydrogen atom, an alkyl group having from 1 to 8 carbon atoms, or an aryl group having from 6 to 10 carbon atoms;

wherein in formula (1), n represents a value greater than 0 and not more than 10; and wherein in formulae (1) and (2), a, c, and d each independently represents a value of from 0 to 4, and b represents a value of from 0 to 3.

We also provide a molded article obtained by melt-molding the above mentioned thermoplastic polyester resin composition.

The thermoplastic polyester resin composition has excellent retention stability. Therefore, the thermoplastic polyester resin composition is capable of producing a molded article excellent in mechanical properties and heat resistance, as well as in long-term hydrolysis resistance.

DETAILED DESCRIPTION

Our thermoplastic polyester resin composition will now be described in detail.

The thermoplastic polyester resin composition includes 100 parts by weight of a thermoplastic polyester resin (A), and from 0.1 to 10 parts by weight of a novolac type epoxy resin (B) represented by formula (1). Although the thermoplastic polyester resin (A) has excellent injection moldability and mechanical properties, ester bonds in the thermoplastic polyester resin (A) are susceptible to breakdown by hydrolysis. When the ester bonds are broken down, the concentration of carboxyl end groups will increase. As the concentration of the carboxyl end groups increases, the decrease in the molecular weight of the thermoplastic polyester resin (A) is accelerated, resulting in reduced mechanical properties. However, since the novolac type epoxy resin (B) represented by formula (1) is added to the thermoplastic polyester resin (A), carboxyl end groups produced by the hydrolysis of the thermoplastic polyester resin (A) react with the novolac type epoxy resin (B) represented by formula (1) to prevent the increase in the concentration of the carboxyl end groups, and as a result, excellent mechanical properties of the thermoplastic polyester resin (A) can be maintained.

The thermoplastic polyester resin (A) is a polymer or a copolymer comprising, as main structural units, at least one type of residue selected from the group consisting of (1) a dicarboxylic acid or an ester-forming derivative thereof and a diol or an ester-forming derivative thereof, (2) a hydroxycarboxylic acid or an ester-forming derivative thereof, and (3) a lactone. As used herein, the expression "comprising as major structural units" means that the resin contains at least one type of residue selected from the group consisting of the above mentioned (1) to (3) in an amount of 50% by mole or more, preferably in an amount of 80% by mole or more, with respect to the total amount of the structural units.

Examples of the dicarboxylic acid or ester-forming derivative thereof include: aromatic dicarboxylic acids such as terephthalic acid, isophthalic acid, phthalic acid, 2,6-naphthalene dicarboxylic acid, 1,5-naphthalene dicarboxylic acid, bis(p-carboxyphenyl)methane, anthracene dicarboxylic acid, 4,4'-diphenyl ether dicarboxylic acid, 5-tetrabutylphosphonium isophthalic acid, and 5-sodium sulfoisophthalic acid; aliphatic dicarboxylic acids such as oxalic acid, succinic acid, adipic acid, sebacic acid, azelaic acid, dodecanedioic acid, malonic acid, glutaric acid, and dimer acid; alicyclic dicarboxylic acids such as 1,3-cyclohexanedicarboxylic acid, and 1,4-cyclohexanedicarboxylic acid; and ester-forming derivatives thereof and the like. Two or more of these compounds may be used.

Examples of the diol or ester-forming derivative thereof include: aliphatic and alicyclic glycols having from 2 to 20 carbon atoms such as ethylene glycol, propylene glycol, 1,4-butanediol, neopentyl glycol, 1,5-pentanediol, 1,6-hexanediol, decamethylene glycol, cyclohexanedimethanol, cyclohexanediol, and dimer diols; long chain glycols with a molecular weight of from 200 to 100,000 such as polyethylene glycol, poly-1,3-propylene glycol, and polytetramethylene glycol; aromatic dioxy compounds such as 4,4'-dihydroxybiphenyl, hydroquinone, t-butylhydroquinone, bisphenol A, bisphenol S, and bisphenol F; ester-forming derivatives thereof and the like. Two or more of these compounds may be used.

Examples of the polymer or copolymer comprising as structural units a residue of a dicarboxylic acid or an ester-forming derivative thereof and a diol or an ester-forming derivative thereof include: aromatic polyester resins such as polyethylene terephthalate, polypropylene terephthalate, polybutylene terephthalate, polycyclohexane dimethylene terephthalate, polyhexylene terephthalate, polyethylene isophthalate, polypropylene isophthalate, polybutylene isophthalate, polycyclohexane dimethylene isophthalate, polyhexylene isophthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate, polybutylene terephthalate/naphthalate, polybutylene terephthalate/decanedicarboxylate, polyethylene terephthalate/cyclohexanedimethylene terephthalate, polyethylene terephthalate/5-sodium sulfoisophthalate, polypropylene terephthalate/5-sodium sulfoisophthalate, polybutylene terephthalate/5-sodium sulfoisophthalate, polyethylene terephthalate/polyethylene glycol, polypropylene terephthalate/polyethylene glycol, polybutylene terephthalate/polyethylene glycol, polyethylene terephthalate/polytetramethylene glycol, polypropylene terephthalate/polytetramethylene glycol, polybutyl ene terephthalate/polytetramethylene glycol, polyethylene terephthalate/isophthalate/polytetramethylene glycol, polypropylene terephthalate/isophthalate/polytetramethylene glycol, polybutylene terephthalate/isophthalate/polytetramethylene glycol, polyethylene terephthalate/succinate, polypropylene terephthalate/succinate, polybutylene terephthalate/succinate, polyethylene terephthalate/adipate, polypropylene terephthalate/adipate, polybutylene terephthalate/adipate, polyethylene terephthalate/sebacate, polypropylene terephthalate/sebacate, polybutylene terephthalate/sebacate, polyethylene terephthalate/isophthalate/adipate, polypropylene terephthalate/isophthalate/adipate, polybutylene terephthalate/isophthalate/succinate, polybutylene terephthalate/isophthalate/adipate, and polybutylene terephthalate/isophthalate/sebacate; and aliphatic polyester resins such as polyethylene oxalate, polypropylene oxalate, polybutylene oxalate, polyethylene succinate, polypropylene succinate, polybutylene succinate, polyethylene adipate, polypropylene adipate, polybutylene adipate, polyneopentyl glycol adipate, polyethylene sebacate, polypropylene sebacate, polybutylene sebacate, polyethylene succinate/adipate, polypropylene succinate/adipate, and polybutylene succinate/adipate and the like. As used herein, "/" represents a copolymer.

Examples of the hydroxycarboxylic acid or ester-forming derivative thereof include: glycolic acid, lactic acid, hydroxypropionic acid, hydroxybutyric acid, hydroxyvaleric acid, hydroxycaproic acid, hydroxybenzoic acid, p-hydroxybenzoic acid, and 6-hydroxy-2-naphthoic acid; ester-forming derivatives thereof and the like. Two or more of these compounds may be used. Further, examples of the polymer or copolymer comprising as structural units a residue of the above mentioned compounds include: aliphatic polyester resins such as polyglycolic acid, polylactic acid, polyglycolic acid/lactic acid and polyhydroxybutyric acid/β-hydroxybutyric acid/β-hydroxyvaleric acid and the like.

Examples of the lactone include: caprolactone, valerolactone, propiolactone, undecalactone, 1,5-oxepane-2-one and the like. Two or more of these compounds may be used. Further, examples of the polymer or copolymer comprising as structural units a residue of the above mentioned compounds include: polycaprolactone, polyvalerolactone, polypropiolactone polycaprolactone/valerolactone and the like.

Among these, preferred as the above mentioned thermoplastic polyester resin (A) is a polymer or a copolymer comprising as main structural units a residue of a dicarboxylic acid or an ester-forming derivative thereof and a residue of a diol or an ester-forming derivative thereof, in terms of improving mechanical properties and heat resistance. More preferred is a polymer or a copolymer comprising as main structural units a residue of an aromatic dicarboxylic acid or an ester-forming derivative thereof and a residue of an aliphatic diol or an ester-forming derivative thereof. Still more preferred is a polymer or a copolymer comprising as main structural units a residue of an aromatic dicarboxylic acid selected from terephthalic acid and naphthalene dicarboxylic acid or an ester-forming derivative thereof, and a residue of an aliphatic diol selected from ethylene glycol, propylene glycol, butanediol and cyclohexanedimethanol, or an ester-forming derivative thereof.

Among these, particularly preferred are aromatic polyester resins such as polyethylene terephthalate, polypropylene terephthalate, polybutylene terephthalate, polycyclohexane dimethylene terephthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate and polybutyl ene terephthalate/naphthalate. More preferred are polybutylene terephthalate, polyethylene terephthalate, polypropylene terephthalate, polyethylene naphthalate, and polycyclohexane dimethylene terephthalate. Still more preferred is polybutylene terephthalate, in terms of improving moldability and crystallinity. Two or more of these compounds may be used in combination at an arbitrary ratio.

The ratio of the amount of the residue of terephthalic acid or ester-forming derivative thereof with respect to the total amount of the dicarboxylic acid residues in the above mentioned polymer or copolymer is preferably 30% by mole or more, and more preferably, 40% by mole or more.

As the thermoplastic polyester resin (A), a liquid crystal polyester resin capable of developing anisotropy during melting can also be used. Examples of the structural unit of the liquid crystal polyester resin include: aromatic oxycarbonyl units, aromatic dioxy units, aromatic and aliphatic dicarbonyl units, alkylenedioxy units, aromatic iminooxy units and the like.

The amount of the carboxyl end groups in the thermoplastic polyester resin (A) is preferably 50 eq/t or less, and more preferably 30 eq/t or less, in terms of improving flowability, hydrolysis resistance and heat resistance. The lower limit of the amount of the carboxyl end groups is 0 eq/t. The amount of the carboxyl end groups in the thermoplastic polyester resin (A) is the amount determined by dissolving the thermoplastic polyester resin (A) in an o-cresol/chloroform solvent, and then titrating the resulting solution with ethanolic potassium hydroxide.

The amount of hydroxy end groups in the thermoplastic polyester resin (A) is preferably 50 eq/t or more, more preferably, 80 eq/t or more, still more preferably, 100 eq/t or more, and particularly preferably, 120 eq/t or more, in terms of improving the moldability and flowability. The upper limit of the amount of the hydroxy end groups is preferably 180 eq/t.

The thermoplastic polyester resin (A) preferably has an intrinsic viscosity, as measured in an o-chlorophenol solution thereof at a temperature of 25° C., of 0.50 to 1.50 dl/g, in terms of improving the moldability.

The thermoplastic polyester resin (A) preferably has a weight average molecular weight (Mw) of greater than 8,000 and not more than 500,000, more preferably, greater than 8,000 and not more than 300,000, and still more preferably greater than 8,000 and not more than 250,000, in terms of further improving the heat resistance. The Mw of the thermoplastic polyester resin (A) is a value in terms of polymethyl methacrylate (PMMA), determined by gel permeation chromatography (GPC) using hexafluoroisopropanol as a solvent.

The thermoplastic polyester resin (A) can be produced by a known method such as polycondensation or ring-opening polymerization. The polymerization method may be either batch polymerization or continuous polymerization, and the reaction may be carried out through transesterification or direct polymerization. The continuous polymerization process is preferred, because the amount of the carboxyl end groups can be reduced while increasing the effect of improving the flowability. In terms of cost, the direct polymerization is preferably used.

When the thermoplastic polyester resin (A) is a polymer or a copolymer comprising as main structural units a residue of a dicarboxylic acid or an ester-forming derivative thereof and a residue of a diol or an ester-forming derivative thereof, the polyester resin can be produced by subjecting the dicarboxylic acid or ester forming derivative thereof and the diol or ester-forming derivative thereof to an esterification reaction or transesterification reaction, followed by a polycondensation reaction.

To efficiently promote the esterification reaction or transesterification reaction and the polycondensation reaction, it is preferred that a polymerization catalyst be added during the reactions. Specific examples of the polymerization catalyst include: organic titanium compounds such as methyl ester, tetra-n-propyl ester, tetra-n-butyl ester, tetraisopropyl ester, tetraisobutyl ester, tetra-tert-butyl ester, cyclohexyl ester, phenyl ester, benzyl ester, and tolyl ester of titanic acid, and mixed esters thereof; tin compounds such as dibutyltin oxide, methylphenyltin oxide, tetraethyltin, hexaethylditin oxide, cyclohexahexylditin oxide, didodecyltin oxide, triethyltin hydroxide, triphenyltin hydroxide, triisobutyltin acetate, dibutyltin diacetate, diphenyltin dilaurate, monobutyltin trichloride, dibutyltin dichloride, tributyltin chloride, dibutyltin sulfide, butylhydroxytin oxide, and alkylstannonic acids such as methylstannonic acid, ethylstannonic acid, and butylstannonic acid; zirconia compounds such as zirconium tetra-n-butoxide; and antimony compounds such as antimony trioxide and antimony acetate and the like.

Among the above mentioned polymerization catalysts, organic titanium compounds and tin compounds are preferred, and tetra-n-propyl ester, tetra-n-butyl ester and tetraisopropyl ester of titanic acid are more preferred. Particularly preferred is tetra-n-butyl ester of titanic acid. Two or more of these compounds can be used in combination. The polymerization catalyst is preferably added in an amount of 0.005 to 0.5 parts by weight, more preferably 0.01 to 0.2 parts by weight, with respect to 100 parts by weight of the thermoplastic polyester resin, in terms of improving the mechanical properties, moldability and color.

The thermoplastic polyester resin composition comprises the thermoplastic polyester resin (A) and the novolac type epoxy resin (B) represented by formula (1). Although the thermoplastic polyester resin tends to be susceptible to degradation by hydrolysis, as described above, the hydrolysis resistance of the polyester resin can be improved by adding thereto the novolac type epoxy resin (B) represented by formula (1) with the polyester resin. In addition, it is also possible to maintain the retention stability of the polyester resin by including the above mentioned novolac type epoxy resin having a specific structure. Two or more of these resins may be included.

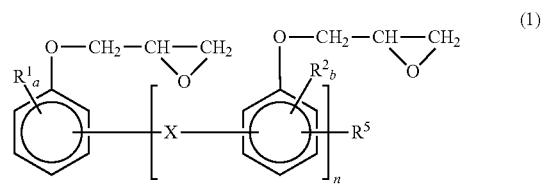

(1)

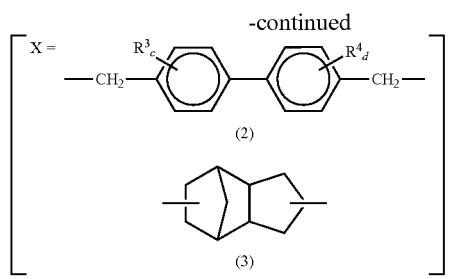

In formula (1), X represents a divalent group represented by formula (2) or (3). In formulae (1) and (2), $R^1$ to $R^4$ each independently represents an alkyl group having from 1 to 8 carbon atoms or an aryl group having from 6 to 10 carbon atoms, and they may be the same or different from each other; and $R^5$ represents a hydrogen atom, an alkyl group having from 1 to 8 carbon atoms, or an aryl group having from 6 to 10 carbon atoms. In formula (1), n represents a value greater than 0 and not more than 10. In formulae (1) and (2), a, c and d each independently represents a value of from 0 to 4, and b represents a value of from 0 to 3.

In terms of further improving the long-term hydrolysis resistance, X in formula (1) is preferably a divalent group represented by formula (2).

The alkyl group having from 1 to 8 carbon atoms may be, for example, a methyl group, an ethyl group, an n-propyl group, an isopropyl group, an n-butyl group, a sec-butyl group, a tert-butyl group or the like. Of these, a methyl group is preferred in terms of reactivity. The aryl group having from 6 to 10 carbon atoms may be, for example, a phenyl group, a methylphenyl group, a dimethylphenyl group, a naphthyl group or the like. Of these, a phenyl group is preferred in terms of reactivity. a, b, c and d are each preferably a value of from 0 to 1, in terms of reactivity.

The blending amount of the novolac type epoxy resin (B) represented by formula (1) to be included in the resin composition is preferably from 0.1 to 10 parts by weight with respect to 100 parts by weight of the thermoplastic polyester resin (A). Long-term hydrolysis resistance is reduced when the blending amount of the component (B) is less than 0.1 parts by weight. On the other hand, when the blending amount of the component (B) is greater than 10 parts by weight, the heat resistance is reduced and bleed-out is more likely to occur. The blending amount of the component (B) is preferably 8 parts by weight or less, and more preferably, 5 parts by weight or less.

The preferred range of the blending amount of the novolac type epoxy resin (B) represented by formula (1) can be selected depending on the epoxy equivalent. For example, the ratio (the blend concentration of epoxy groups/ the blend concentration of carboxyl end groups) of the blend concentration (eq/g) of the epoxy groups derived from the novolac type epoxy resin (B) represented by formula (1) in the thermoplastic polyester resin composition to the blend concentration (eq/g) of the carboxyl end groups derived from the thermoplastic polyester resin (A) in the thermoplastic polyester resin composition is preferably from 1 to 8. When the ratio of the blend concentration of the epoxy groups to the blend concentration of the carboxyl end groups is 1 or more, the long-term hydrolysis resistance can be further improved. It is more preferred that the ratio of the concentration of the epoxy groups to the concentration of the carboxyl end groups be 2 or more. Further, when the ratio of the blend concentration of the epoxy groups to the blend concentration of the carboxyl end groups is 8 or less, it is possible to prevent the occurrence of bleed-out, and to achieve the balance between the heat resistance and the mechanical properties at a higher level. The ratio is preferably 7 or less, and more preferably, 5 or less.

Note that the blend concentration of the carboxyl end groups derived from the thermoplastic polyester resin (A) in the thermoplastic polyester resin composition is a value of the concentration of the carboxyl end groups calculated from the concentration of the carboxyl end groups in the component (A), which is a raw material, and from the blending ratio of the component (A) with respect to the total amount of the thermoplastic polyester resin composition. The concentration of the carboxyl end groups in the thermoplastic polyester resin (A) can be calculated by: dissolving the thermoplastic polyester resin (A) in a mixed solution of o-cresol/chloroform (2/1 vol) to prepare a solution; and then titrating the solution with 0.05 mol/L ethanolic potassium hydroxide, using 1% bromophenol blue as an indicator.

Further, the blend concentration of the epoxy groups derived from the novolac type epoxy resin (B) represented by formula (1) in the thermoplastic polyester resin composition is a value of the concentration of the epoxy groups calculated from the concentration of the epoxy groups in the component (B), which is a raw material, and from the blending ratio of the component (B) with respect to the total amount of the thermoplastic polyester resin composition. The concentration of the epoxy groups in the novolac type epoxy resin (B) represented by formula (1) can be calculated by: dissolving the novolac type epoxy resin (B) represented by formula (1) in chloroform to prepare a solution; adding thereto acetic acid and a solution of triethylammonium bromide in acetic acid; and subjecting the resulting solution to potentiometric titration with 0.1 mol/L perchloric acid-acetic acid, in accordance with JIS K7236:2001.

As a first factor to achieve the desired hydrolysis resistance, we believe it is important to reduce the amount of the carboxyl end groups originally present in the thermoplastic polyester resin (A) by adding thereto the novolac type epoxy resin (B) represented by formula (1) so that the carboxyl end groups are allowed to react with the epoxy groups of the novolac type epoxy resin (B). In view of this, it is preferred that the concentration of the carboxyl end groups with respect to the amount of the thermoplastic polyester resin (A), in the thermoplastic polyester resin composition after melt blending, be as low as possible. The concentration is preferably 20 eq/t or less, and particularly preferably, 15 eq/t or less. As used herein, the concentration of the carboxyl end groups with respect to the amount of the thermoplastic polyester resin (A) is a value obtained by: measuring the concentration of the carboxyl end groups with respect to the total amount of the thermoplastic polyester resin composition; and then dividing the measured concentration by the blending ratio of the thermoplastic polyester resin (A). Note that the thermoplastic polyester resin (A) in the thermoplastic polyester resin composition as used herein includes the reaction product of the thermoplastic polyester resin (A) and the epoxy compound. The concentration of the carboxyl end groups with respect to the amount of the thermoplastic polyester resin (A) in the thermoplastic polyester resin composition is obtained by: dissolving the thermoplastic polyester resin composition in a mixed solution of o-cresol/ chloroform (2/1 vol) to prepare a solution; titrating the solution with 0.05 mol/L ethanolic potassium hydroxide, using 1% bromophenol blue as an indicator, to calculate the concentration of the carboxyl end groups with respect to the total amount of the thermoplastic polyester resin composition; and then dividing the calculated concentration by the blending ratio of the thermoplastic polyester resin (A).

Further, as a second factor to achieve the hydrolysis resistance, we believe it is important to reduce the amount of the carboxyl end groups which will be produced by the hydrolysis of the thermoplastic polyester resin (A), as well, by allowing the carboxyl end groups to react with the epoxy groups. In view of this, the concentration of the epoxy groups in the thermoplastic polyester resin composition after melt blending is preferably 5 eq/t or more, more preferably, 10 eq/t or more, and particularly preferably, 20 eq/t or more. The concentration of the epoxy groups in the thermoplastic polyester resin composition after melt blending is preferably 260 eq/t or less. The concentration of the epoxy groups in the thermoplastic polyester composition can be calculated by: dissolving the thermoplastic polyester resin composition in a mixed solution of o-cresol/chloroform (2/1 vol) to prepare a solution; adding thereto acetic acid and a solution of triethylammonium bromide in acetic acid; and subjecting the resulting solution to potentiometric titration with 0.1 mol/L perchloric acid-acetic acid.

It is preferred that the thermoplastic polyester resin composition further include a phosphorus-based stabilizer (C). The novolac type epoxy resin (B) represented by formula (1) tends to produce phenoxy radicals and/or quinones in the thermoplastic polyester resin composition, which cause the yellowing of the resulting molded articles. By including the (C) phosphorus-based stabilizer along with the novolac type epoxy resin (B) represented by formula (1), it is possible to prevent yellowing of the molded articles due to structures derived from the novolac type epoxy resin (B) represented by formula (1), thereby improving the color of the molded articles.

The phosphorus-based stabilizer (C) is a compound containing a structure represented by formula (4) or (5), in other words, a structure in which two or more oxygen atoms are bound to a phosphorus atom with a lone pair. When the above mentioned structure is contained, the structure is coordinated to the phenoxy radicals and/or quinones, which are derived from the novolac type epoxy resin and are the cause of the coloration, thereby allowing for the decomposition of the phenoxy radicals and/or quinones, or the prevention of the coloration. Note that in a common phosphorus compound the upper limit of the number of oxygen atoms capable of binding to a phosphorus atom with a lone pair is 3, based on the valency of a phosphorus atom.

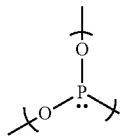

(4)

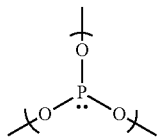

(5)

Examples of the phosphorus-based stabilizer (C), specifically, examples of the compound containing a structure in which two oxygen atoms are bound to a phosphorus atom with a lone pair include phosphonite compounds; and examples of the compound containing a structure in which three oxygen atoms are bound to a phosphorus atom with a lone pair include phosphite compounds.

The phosphonite compound may be, for example, a condensation product of a phosphonous acid compound such as phenylphosphonous acid or 4,4'-biphenylene diphosphonous acid and an aliphatic alcohol having 4 to 25 carbon atoms and/or a phenol compound such as 2,6-di-t-butylphenol or 2,4-di-t-butyl-5-methylphenol. Specific examples thereof include: bis(2,4-di-t-butyl-5-methylphenyl)-phenylphosphonite, tetrakis(2,4-di-t-butyl-5-methylphenyl)-4,4'-biphenylene diphosphonite, tetrakis(2,4-di-t-butylphenyl)-4,4'-biphenylene diphosphonite and the like.

Among these, tetrakis(2,4-di-t-butyl-5-methylphenyl)-4,4'-biphenylene diphosphonite and tetrakis(2,4-di-t-butylphenyl)-4,4'-biphenylene diphosphonite are preferred, in terms of the thermal stability of the phosphorus-based stabilizer (C).

The phosphite compound may be, for example, a condensation product of a phosphorous acid, an aliphatic alcohol having 4 to 25 carbon atoms, a polyol such as glycerol or pentaerythritol, and/or a phenol compound such as 2,6-di-t-butylphenol or 2,4-di-t-butylphenol. Specific examples thereof include: tris(alkylaryl) phosphites (note, however, that the alkyl group in this case is a branched alkyl group having 3 to 6 carbon atoms) such as triisodecyl phosphite, trisnonylphenyl phosphite, diphenyl isodecyl phosphite, phenyl diisodecyl phosphite, 2,2-methylenebis(4,6-di-t-butylphenyl)octyl phosphite, 4,4'-butylidenebis(3-methyl-6-t-butylphenyl)ditridecyl phosphite, tris(2,4-di-t-butylphenyl) phosphite, tris(2-t-butyl-4-methylphenyl) phosphite, tris(2,4-di-t-amylphenyl) phosphite, tris(2-t-butylphenyl) phosphite, tris[2-(1,1-dimethylpropyl)-phenyl] phosphite, and tris[2,4-(1,1-dimethylpropyl)-phenyl] phosphite; bis(alkylaryl)pentaerythritol diphosphites (note, however, that the alkyl group in this case is an alkyl group having 3 to 9 carbon atoms) such as bis(2-t-butylphenyl)phenyl phosphite, tris(2-cyclohexylphenyl) phosphite, tris(2-t-butyl-4-phenylphenyl) phosphite, bis(octyl)pentaerythritol diphosphite, bis(octadecyl)pentaerythritol diphosphite, bis(2,4-di-t-butyl-4-methylphenyl)pentaerythritol diphosphite, bis(2,6-di-t-butyl-4-methylphenyl)pentaerythritol diphosphite, bis(nonylphenyl)pentaerythritol diphosphite, and bis(nonylphenyl)pentaerythritol diphosphite and the like. Two or more of these compounds may be used.

Among these, bis(alkylaryl)pentaerythritol diphosphite is preferred; and bis(2,4-di-t-butyl-4-methylphenyl)pentaerythritol diphosphite and bis(2,6-di-t-butyl-4-methylphenyl)pentaerythritol diphosphite are more preferred in terms of the thermal stability of the phosphorus-based stabilizer (C).

The blending amount of the phosphorus-based stabilizer (C) to be included in the resin composition can be adjusted as appropriate depending on the type and the blending amount of the novolac type epoxy resin (B) represented by formula (1). However, the blending amount of the phosphorus-based stabilizer (C) is preferably 0.01 to 1 part by weight with respect to 100 parts by weight of the thermoplastic polyester resin (A). The color of the resulting molded article can be improved when the blending amount of the phosphorus-based stabilizer (C) is 0.01 parts by weight or more. When the blending amount of the phosphorus-based stabilizer (C) is 1 part by weight or less, on the other hand, the long-term hydrolysis resistance and the mechanical properties can further be improved. The blending amount is more preferably 0.5 parts by weight or less.

It is preferred that the thermoplastic polyester resin composition further includes a monofunctional epoxy compound (D). The monofunctional epoxy compound (D) generally has less steric hindrance around its epoxy group compared to a multifunctional epoxy group in which ester groups generated by the reaction of a portion of the epoxy groups in its molecule cause a steric hindrance and, thus, it has a better reactivity with the carboxyl end groups of the thermoplastic polyester resin (A) than the novolac type epoxy resin (B) represented by formula (1). As a result, the monofunctional epoxy compound (D) is capable of preventing the increase in the viscosity due to the crosslinking of the novolac type epoxy resin (B) represented by formula (1), and further improving the retention stability of the thermoplastic polyester resin composition. In addition, the monofunctional epoxy compound (D) having less steric hindrance is also capable of reacting with the carboxyl end groups of the thermoplastic polyester resin (A) with which the novolac type epoxy resin (B) represented by formula (1) cannot react due to the steric hindrance and, accordingly, the increase in the carboxyl end group concentration can further be prevented, thereby further improving the long-term hydrolysis resistance.

The monofunctional epoxy compound (D) is not particularly limited as long as it is a compound which contains only one epoxy group. However, a monofunctional glycidyl ether compound, and a monofunctional glycidyl ester compound are preferred.

Examples of the glycidyl ether compound containing only one epoxy group include glycidyl ethers of monovalent alcohols and phenols containing only one hydroxyl group. Examples of the glycidyl ethers of monovalent alcohols include butyl glycidyl ether, stearyl glycidyl ether, allyl glycidyl ether, ethylene oxide lauryl alcohol glycidyl ether, ethylene oxide phenol glycidyl ether and the like. Examples of the glycidyl ethers of monovalent phenols include phenyl glycidyl ether, o-phenylphenyl glycidyl ether and the like. Two or more of these compounds may be used.

Examples of the glycidyl ester compound containing only one epoxy group include glycidyl esters of saturated aliphatic monocarboxylic acids, glycidyl esters of unsaturated aliphatic monocarboxylic acids, glycidyl esters of aromatic monocarboxylic acids and the like. Examples of the glycidyl esters of saturated aliphatic monocarboxylic acids include glycidyl cyclohexanecarboxylate, glycidyl stearate, glycidyl laurate, glycidyl palmitate, glycidyl versatate and the like. Examples of the glycidyl esters of unsaturated aliphatic monocarboxylic acids include glycidyl oleate, glycidyl linoleate, glycidyl linolenate and the like. Examples of the glycidyl esters of aromatic monocarboxylic acids include glycidyl 4-tert-butylbenzoate, glycidyl p-toluate and the like. Two or more of these compounds may be used.

Among these, a glycidyl ester compound of a saturated aliphatic monocarboxylic acid and/or a glycidyl ester of an aromatic monocarboxylic acid are/is preferred, in terms of the reactivity with the carboxyl end groups of the thermoplastic polyester resin (A). More preferred are/is glycidyl 4-tert-butylbenzoate and/or glycidyl versatate.

The blending amount of the monofunctional epoxy compound (D) to be included in the resin composition can be adjusted depending on the type and the blending amount of the novolac type epoxy resin (B) represented by formula (1). However, the blending amount of the monofunctional epoxy compound (D) is preferably 0.01 to 1 part by weight with respect to 100 parts by weight of the thermoplastic polyester resin (A). When the blending amount of the monofunctional epoxy compound (D) is 0.01 parts by weight or more, the retention stability of the thermoplastic polyester resin composition can further be improved. The blending amount is more preferably 0.1 parts by weight or more. When the blending amount of the monofunctional epoxy compound (D) is 1 part by weight or less, on the other hand, it is possible to further improve the mechanical properties and to prevent the occurrence of bleed-out. The blending amount is more preferably 0.6 parts by weight or less.

It is preferred that the thermoplastic polyester resin composition further include a reaction catalyst (E). By including the reaction catalyst (E), the reaction between the carboxyl end groups of the thermoplastic polyester resin (A) and the epoxy groups of the novolac type epoxy resin (B) represented by formula (1) can be facilitated, thereby significantly improving the long-term hydrolysis resistance of the thermoplastic polyester resin composition.

The reaction catalyst (E) is not limited as long as it is capable of facilitating the reaction between the carboxyl end groups of the thermoplastic polyester resin (A) and the epoxy groups of the novolac type epoxy resin (B) represented by formula (1). Examples of the reaction catalyst (E) which can be used include tertiary amines, amidine compounds, organic metal compounds, organic phosphines, imidazoles, boron compounds and the like. Two or more of these compounds may be included.

The reaction catalyst (E) is preferably a compound containing nitrogen or phosphorus; more preferably, a tertiary amine, an amidine compound, an organic phosphine and/or the like; and still more preferably, an amidine compound, for being able to facilitate the reactivity between the carboxyl end of thermoplastic polyester resin (A) and the novolac type epoxy resin (B) represented by formula (1), and thereby improving the long-term hydrolysis resistance.

Examples of the tertiary amine include benzyldimethylamine, 2-(dimethylaminomethyl)phenol, 2,4,6-tris(diaminomethyl)phenol, 2,4,6-tris(diaminomethyl)phenol and the like. As the tertiary amine, a compound in its salt form such as a salt with tri-2-ethylhexyl acid can also be used.

Examples of the amidine compound include 1,8-diazabicyclo(5,4,0)undecene-7, 1,5-diazabicyclo(4,3,0)nonene-5,6-dibutylamino-1,8-diazabicyclo(5,4,0)undecene-7, 7-methyl-1,5,7-triazabicyclo(4,4,0)decene-5 and the like. Further, as the amidine compound, a compound in the form of a salt with an inorganic acid or an organic acid such as 1,8-diazabicyclo(5,4,0)undecene-7-tetraphenylborate can also be used.

Examples of the organic metal compound include metal salts of stearic acid such as sodium stearate, magnesium stearate, calcium stearate, potassium stearate, and lithium stearate; chromium acetylacetonate, zinc acetylacetonate, nickel acetylacetonate, triethanolamine titanate, tin octylate and the like.

Examples of the organic phosphine include triparatolylphosphine, tris-4-methoxyphenylphosphine, tetrabutylphosphonium bromide, butyltriphenylphosphonium bromide, tetraphenylphosphonium tetraphenylborate, triphenylphosphine, triphenylphosphine triphenylborane, triphenylphosphine 1,4-benzoquinone adduct and the like.

Examples of the imidazole include 2-methylimidazole, 2-aminoimidazole, 2-methyl-1-vinylimidazole, 2-ethyl-4-methylimidazole, 2-heptadecylimidazole, 2-phenylimidazole, 2-undecylimidazole, 1-allylimidazole, 1-cyanoethyl-2-methylimidazole, 1-cyanoethyl-2-undecylimidazole, 1-cyanoethyl-2-undecylimidazolium trimellitate, 1-benzyl-2-methylimidazole, 1-cyanoethyl-2-ethyl-4-methylimidazole, 1-cyanoethyl-2-phenylimidazolium trimellitate, 1-dodecyl-2-methyl-3-benzylimidazolium chloride, 2-methylimidazolium isocyanurate, 2-phenylimidazolium isocyanurate, 2,4-diamino-6-[2-methylimidazolyl-(1)]ethyl- S-triazine, 1,3-dibenzyl-2-methylimidazolium chloride, 1,3-diazoliminazole, 1-cyanoethyl-2-phenyl-4,5-di(cyanoethoxymethyl)imidazole, 2-phenyl-4,5-dihydroxymethylimidazole, 2-phenyl-4-methyl-5-hydroxymethylimidazole, 2,4-diamino-6-[2-undecylimidazolyl-(1)]ethyl-S-triazine and the like.

Examples of the boron compound include boron trifluoride-n-hexylamine, boron trifluoride-monoethylamine, boron trifluoride-benzylamine, boron trifluoride-diethylamine, boron trifluoride-piperidine, boron trifluoride-triethylamine, boron trifluoride-aniline, boron tetrafluoride-n-hexylamine, boron tetrafluoride-monoethylamine, boron tetrafluoride-benzylamine, boron tetrafluoride-diethylamine, boron tetrafluoride-piperidine, boron tetrafluoride-triethylamine, boron tetrafluoride-aniline and the like.

The blending amount of the reaction catalyst (E) is preferably 0.001 to 5 parts by weight with respect to 100 parts by weight of the thermoplastic polyester resin (A). The long-term hydrolysis resistance can be further improved when the blending amount of the component (E) is 0.001 parts by weight or more. The blending amount is more preferably 0.01 parts by weight or more, and still more preferably, 0.02 parts by weight or more. On the other hand, when the blending amount of the component (E) is 5 parts by weight or less, it is possible to further improve the long-term hydrolysis resistance while maintaining the mechanical properties. The blending amount is more preferably 3 parts by weight or less, and still more preferably 1 part by weight or less.

Further, the preferred range of the blending amount of the reaction catalyst (E) can be selected depending on the epoxy equivalent of the novolac type epoxy resin (B) represented by formula (1). For example, the ratio (the blend concentration of the reaction catalyst/the blend concentration of the epoxy groups) of the blend concentration (mol/g) of the reaction catalyst (E) in thermoplastic polyester resin composition to the blend concentration (eq/g) of the epoxy groups derived from the novolac type epoxy resin (B) represented by formula (1) in the thermoplastic polyester resin composition is preferably 0.01 to 0.1. The long-term hydrolysis resistance can further be improved when the ratio of the blend concentration of the reaction catalyst to the concentration of the epoxy groups is 0.01 or more. The ratio is more preferably, 0.02 or more, and still more preferably, 0.03 or more. When the ratio of the blend concentration of the reaction catalyst to the concentration of the epoxy groups is 0.1 or less, on the other hand, the balance between the long-term hydrolysis resistance, retention stability, and mechanical properties can be achieved at a higher level. The ratio is more preferably, 0.06 or less.

Note that, the blend concentration of the reaction catalyst (E) in the thermoplastic polyester resin composition is a value calculated from the molecular weight of the reaction catalyst and from the blending ratio of the component (E) with respect to the total amount of the thermoplastic polyester resin composition.

The thermoplastic polyester resin composition may include one or more known additives such as an ultraviolet absorber, a photostabilizer, a plasticizer and an antistatic agent, to the extent that the characteristics of the composition are not impaired.

The thermoplastic polyester resin composition may also include a thermoplastic resin other than the component (A) to improve moldability, dimensional accuracy, mold shrinkage and toughness of the resin composition and the resulting molded article. Examples of the thermoplastic resin other than the component (A) include: low density polyethylene resins, high density polyethylene resins, polypropylene resins, polyamide resins, polyacetal resins, polyurethane resins, aromatic polyketone resins, aliphatic polyketone resins, polyphenylene sulfide resins, polyether ether ketone resins, polyimide resins, thermoplastic starch resins, polyurethane resins, methyl methacrylate styrene resins (MS resin), aromatic polycarbonate resins, polyarylate resins, polysulfone resins, polyethersulfone resins, phenoxy resins, polyphenylene ether resins, poly-4-methylpentene-1, polyetherimide resins, cellulose acetate resins, polyvinyl alcohol resins and the like. Two or more of these resins may be included. In particular, an aromatic polycarbonate resin is preferred in terms of improving the dimensional accuracy and reducing the mold shrinkage.

The aromatic polycarbonate resin may be an aromatic homo- or co-polycarbonate obtained by reacting an aromatic divalent phenolic compound with phosgene or a carbonic acid diester.

Examples of the aromatic divalent phenolic compound which can be used include 2,2-bis(4-hydroxyphenyl)propane, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl)butane, 2,2-bis(4-hydroxy-3,5-diphenyl)butane, 2,2-bis(4-hydroxy-3,5-diethylphenyl)propane, 2,2-bis(4-hydroxy-3,5-diethylphenyl)propane, 1,1-bis(4-hydroxyphenyl)cyclohexane, 1-phenyl-1,1-bis(4-hydroxyphenyl)ethane and the like. Two or more of these compounds may be used.

The aromatic polycarbonate resin preferably has a weight average molecular weight of 10,000 to 1,100,000. The mechanical properties of the thermoplastic polyester resin composition can be further improved when the weight average molecular weight of the aromatic polycarbonate resin is 10,000 or more. The weight average molecular weight is preferably 60,000 or more. On the other hand, the flowability during molding can be improved when the weight average molecular weight is 1,100,000 or less. The weight average molecular weight as used herein refers to a value in terms of polystyrene, as determined by gel permeation chromatography, using tetrahydrofuran as a solvent.

Further, the aromatic polycarbonate resin preferably has a melt flow rate (MFR), as determined under the conditions of a temperature of 300° C. and a load of 11.8 N, within 1 to 100 g/10 min. In terms of the mechanical properties, the melt flow rate is more preferably 1 to 50 g/10 min.

The blending amount of the aromatic polycarbonate resin is preferably 1 to 100 parts by weight with respect to 100 parts by weight of the thermoplastic polyester resin (A). When the blending amount of the aromatic polycarbonate resin is 1 part by weight or more, improvement in the dimensional accuracy and the reduction in the mold shrinkage of the resulting molded article can be achieved. The blending amount is more preferably 10 parts by weight or more. On the other hand, when the blending amount of the aromatic polycarbonate resin is 100 parts by weight or less, heat resistance of the molded article can further be improved. The blending amount is more preferably 60 parts by weight or less.

Further, the thermoplastic polyester resin composition may include a small amount of an acidic phosphoric acid ester compound along with the aromatic polycarbonate resin. Since the acidic phosphoric acid ester compound is useful in preventing the transesterification reaction between the thermoplastic polyester resin (A) and the aromatic polycarbonate resin, the heat resistance of the resin composition can further be improved. The acidic phosphoric acid ester compound as described above is a generic term used to refer to a partially esterified product of an alcohol and phosphoric acid. Those with a low molecular weight are in the form of a colorless liquid and those with a high molecular weight are in the form of white wax or flake-like solid. The acidic phosphoric acid ester compound is distinguished from a phosphoric acid ester which is a phosphorus-based flame retardant obtained by substituting hydrogen atom(s) in phosphoric acid with an alkyl group(s) or an allyl group(s) and is used for different purposes. Examples of the preferred acidic phosphoric acid ester compound include long-chain alkyl acid phosphate compounds such as a mixture of monostearyl and distearyl acid phosphates. These compounds are commercially available, for example, from ADEKA corporation under the tradename "ADEKASTAB" (registered trademark) AX-71, which is in the form of flake-like solid having a melting point. Two or more of these compounds may be included.

Further, the blending amount of the acidic phosphoric acid ester compound is preferably 0.01 parts by weight or more with respect to the total of 100 parts by weight of the thermoplastic polyester resin (A) and the aromatic polycarbonate resin because the heat resistance of the resulting molded article can further be improved. The blending amount of the acidic phosphoric acid ester compound is more preferably 0.05 parts by weight or more. On the other hand, the blending amount is preferably 2 parts by weight or less because higher mechanical properties can be maintained. The blending amount is more preferably 1 part by weight or less.

It is preferred that the thermoplastic polyester resin composition further include a vinyl resin for the purpose of improving the toughness such as impact strength. Examples of the vinyl resin include: resins obtained by polymerizing one or more types of monomers selected from the group consisting of aromatic vinyl compounds, vinyl cyanide compounds, alkyl (meth)acrylates and maleimide monomers; and resins obtained by graft-polymerizing or copolymerizing these monomers with a rubber component such as polybutadiene rubber. It is preferred that the total amount of the aromatic vinyl compound(s), vinyl cyanide compound(s), alkyl (meth)acrylate(s) and maleimide monomer(s) be 50% by weight or more with respect to the total amount of the monomers.

Examples of the aromatic vinyl compound include styrene, α-methylstyrene, vinyltoluene, divinylbenzene and the like. Examples of the vinyl cyanide compound include acrylonitrile, methacrylonitrile and the like. Examples of the maleimide monomer include maleimide; N-substituted maleimides such as N-methylmaleimide, N-ethylmaleimide, N-phenylmaleimide, and N-cyclohexylmaleimide; derivatives thereof and the like. Further, a vinyl resin obtainable by copolymerizing the above mentioned monomer(s) with a diene compound, a dialkyl maleate, an allyl alkyl ether, an unsaturated amino compound, a vinyl alkyl ether and/or the like can also be used.

Preferred examples of the vinyl resin include: vinyl (co)polymers such as methyl methacrylate/acrylonitrile, polystyrene resins, acrylonitrile/styrene resins (AS resins), styrene/butadiene resins, styrene/N-phenylmaleimide resins, and styrene/acrylonitrile/N-phenylmaleimide resins; styrene-based resins modified with a rubbery polymer such as acrylonitrile/butadiene/styrene resins (ABS resins), acrylonitrile/butadiene/methyl methacrylate/styrene resins (MABS resins), and high impact polystyrene resins; block copolymers such as styrene/butadiene/styrene resins, styrene/isoprene/styrene resins, and styrene/ethylene/butadiene/styrene resins and the like. Two or more of these compounds may be included. Among these, a polystyrene resin and an acrylonitrile/styrene resin are preferred, and an acrylonitrile/styrene resin is more preferred.

As the acrylonitrile/styrene resin, an acrylonitrile/styrene resin containing 15% by weight or more and less than 35% by weight of acrylonitrile is particularly preferably used.

Further, the vinyl resin may be graft polymerized or copolymerized with an unsaturated monocarboxylic acid, an unsaturated dicarboxylic acid, an unsaturated acid anhydride or an epoxy group-containing vinyl monomer. In particular, it is preferred that the vinyl resin be graft polymerized or copolymerized with an unsaturated acid anhydride or an epoxy group-containing vinyl monomer.

The above mentioned unsaturated acid anhydride is a compound containing both a radically polymerizable vinyl group and an acid anhydride within one molecule, and preferred specific examples thereof include maleic anhydride and the like.

The epoxy group-containing vinyl monomer is a compound containing both a radically polymerizable vinyl group and two or more epoxy groups within one molecule. Preferred specific examples thereof include: glycidyl esters of unsaturated organic acids such as glycidyl acrylate, glycidyl methacrylate, glycidyl ethacrylate, and glycidyl itaconate; glycidyl ethers such as allyl glycidyl ether; 2-methylglycidyl methacrylate and the like. Of these, glycidyl acrylate and glycidyl methacrylate are preferably used. Two or more of these compounds may be used in combination.

When an unsaturated monocarboxylic acid, an unsaturated dicarboxylic acid, an unsaturated acid anhydride or an epoxy group-containing vinyl monomer is used for the graft polymerization or copolymerization, the amount thereof to be used is preferably 0.05% by weight or more with respect to the amount of the vinyl resin. In terms of preventing gelation and improving flowability, the amount thereof to be used is preferably 20% by weight or less, more preferably, 10% by weight or less, and still more preferably, 5% by weight or less.

Further, the vinyl resin may be an epoxy-modified vinyl resin modified with an epoxidizing agent such as a peroxide, performic acid, peracetic acid and perbenzoic acid. Note, however, that the number of epoxy groups within one molecule is 2 or more. In this case, it is preferred that the vinyl resin be random-copolymerized or block-copolymerized with a diene monomer to facilitate effective epoxy modification. Preferred examples of the diene monomer include butadiene, isoprene and the like. Preferred production methods of these epoxy modified vinyl resins are disclosed, for example, in JP 6-256417 A, JP 6-220124 A and the like.

Also preferred as the vinyl resin is a core-shell type rubber having a so-called core-shell type structure consisting of an inner layer (core layer) made of rubber, and an outer layer (shell layer) made of a vinyl resin and covering the inner layer.

The rubber used to form the core layer may be any type of rubber constituted by a polymer component having a rubber elasticity. Examples of the polymer component having a rubber elasticity include rubbers constituted by a polymerization product of an acrylic component, silicone component, styrene component, nitrile component, conjugated diene component, urethane component, ethylene propylene component or the like. A preferred rubber may be, for example, a rubber constituted by a polymerization product of: an acrylic component such as ethyl acrylate unit or butyl acrylate unit; a silicone component such as dimethylsiloxane unit or phenylmethylsiloxane unit; a styrene component such as styrene unit or α-methylstyrene unit; a nitrile component such as acrylonitrile unit or methacrylonitrile unit; or a conjugated diene component such as butadiene unit or isoprene unit. Further, a rubber constituted by a copolymerization product of two or more types of the above mentioned components is also preferably used.

In addition, the vinyl resin used as the outer layer (shell layer) may be a vinyl resin graft polymerized or copolymerized with an unsaturated monocarboxylic acid, an unsaturated dicarboxylic acid, an unsaturated acid anhydride, or an epoxy group-containing vinyl monomer; or an epoxy-modified vinyl resin obtained by modifying a vinyl resin with an epoxidizing agent such as a peroxide, performic acid, peracetic acid or perbenzoic acid.

Preferred examples of the core-shell type rubber include: one having a core layer of a dimethylsiloxane/butyl acrylate copolymer and an outermost layer of a methyl methacrylate polymer or acrylonitrile/styrene copolymer, one having a core layer of a butadiene/styrene copolymer and an outermost layer of a methyl methacrylate polymer or acrylonitrile/styrene copolymer; and one having a core layer of a butyl acrylate polymer and an outermost layer of a methyl methacrylate polymer or acrylonitrile/styrene copolymer and the like. Further, it is more preferred that either one or both of the rubber layer and the outermost layer be composed of a polymer containing a glycidyl methacrylate unit.

Regarding the weight ratio of the core and shell in the core-shell type rubber, the weight of the core layer with respect to the total weight of the core-shell type rubber, is preferably 10% by weight or more and 90% by weight or less, and more preferably, 30% by weight or more and 80% by weight or less.

The core-shell type rubber may be a commercially available product satisfying the above mentioned requirements, or it can be produced by an arbitrary method. Examples of the commercially available product include "METABLEN" (registered trademark), manufactured by Mitsubishi Rayon Co., Ltd.; "KANE ACE" (registered trademark), manufactured by Kaneka Corporation; "PARALOID" (registered trademark), manufactured by The Dow Chemical Company; and "PARAPET" (registered trademark) SA, manufactured by Kuraray Co., Ltd. Two or more of these may be used.

Further, a vinyl resin in which a vinyl resin is contained as a branched chain of a graft copolymer may also be used. Examples of resins capable of constituting the main chain in such a resin include polyolefin resins, acrylic resins and polycarbonate resins. Either the branched chain or the main chain may be modified with glycidyl methacrylate or an acid anhydride. Specific examples thereof include poly(ethylene/glycidyl methacrylate)-g-polymethyl methacrylate (E/GMA-g-PMMA), poly(ethylene/glycidyl methacrylate)-g-polystyrene (E/GMA-g-PS), poly(ethylene/glycidyl methacrylate)-g-acrylonitrile/styrene (E/GMA-g-AS), poly(ethylene-g-acrylonitrile/styrene (E-g-AS), polycarbonate-g-acrylonitrile/styrene (PC-g-AS) and the like (wherein "-g" represents graft polymerization and "-/-" represents copolymerization).

The commercially available product of the vinyl resin in which a vinyl resin is contained as a branched chain of a graft copolymer include "MODIPER" (registered trademark) manufactured by NOF Corporation. These may be used in combination with other vinyl resins.

The blending amount of the vinyl resin to be included in the resin composition is preferably 0.1 to 40 parts by weight with respect to 100 parts by weight of the thermoplastic polyester resin (A), in terms of improving the toughness and mechanical properties. The toughness is further improved when the blending amount of vinyl resin is 0.1 parts by weight or more. The blending amount of the vinyl resin is more preferably 0.5 parts by weight or more, and still more preferably, 1 part by weight or more. On the other hand, the mechanical properties are further improved when the blending amount of the vinyl resin is 40 parts by weight or less. The blending amount of the vinyl resin is more preferably 35 parts by weight or less, and still more preferably, 30 parts by weight or less.

The thermoplastic polyester resin composition can further include another resin capable of improving the impact strength, in addition to the thermoplastic polyester resin (A), the thermoplastic resin other than the thermoplastic resin (A), and the vinyl resin. Examples of the resin capable of improving the impact strength include: ethylene-propylene copolymers, ethylene-propylene-non-conjugated diene copolymers, ethylene-butene-1 copolymers, natural rubber, thiokol rubber, polysulfide rubber, polyether rubber, epichlorohydrin rubber, and modified olefin resins obtained by acid modification with an acid anhydride such as maleic anhydride, or by epoxy modification with glycidyl methacrylate and an epoxidizing agent, of ethylene and the like. Note that, however, when carrying out the epoxy modification, number of the epoxy groups within one molecule is two or more. These resins may have varying degrees of crosslinking, and various types of microstructures such as cis and trans structures.

Examples of the modified olefin resin obtained by acid modification with an acid anhydride such as maleic anhydride, or by epoxy modification with glycidyl methacrylate and epoxidizing agent, of ethylene, include: ethylene/glycidyl methacrylate, ethylene/butene-1/maleic anhydride, ethylene/propylene/maleic anhydride, ethylene/maleic anhydride, and epoxidized olefin resins produced by epoxidizing ethylene with a peroxide or the like. Examples of the commercially available product of the above mentioned resin include "BONDFAST" (registered trademark) E (ethylene/glycidyl methacrylate), manufactured by Sumitomo Chemical Company, Ltd.; "TOUGHMER" (registered trademark) MH-5010 and MH-5020 (ethylene/butene-1/maleic anhydride), manufactured by Mitsui Chemicals, Inc. and the like. In particular, ethylene/butene-1/maleic anhydride is preferably used, since it is capable of significantly improving the impact strength.

The blending amount of the resin capable of improving the impact strength is preferably 0.1 to 10 parts by weight, with respect to 100 parts by weight of the thermoplastic polyester resin (A). The impact strength is further improved when the blending amount is 0.1 parts by weight or more. The blending amount is more preferably 0.5 parts by weight or more, and still more preferably, 1 part by weight or more. On the other hand, the mechanical properties are further improved when the blending amount is 10 parts by weight or less. The blending amount is more preferably 8 parts by weight or less, and still more preferably, 6 parts by weight or less.

The thermoplastic polyester resin composition can further include a polyol compound containing an alkylene oxide unit having three or more functional groups. Incorporation of such a compound improves the flowability during molding such as injection molding. As used herein, the polyol compound refers to a compound containing two or more hydroxyl groups. The polyol compound may be a low molecular weight compound or a polymer, and any polyol compound containing one or more alkylene oxide units each having three or more functional groups can be preferably used. The functional group as used herein is a functional group selected from a hydroxyl group, an aldehyde group, a carboxylic acid group, a sulfo group, an amino group, a glycidyl group, an isocyanate group, a carbodiimide group, an oxazoline group, an oxazine group, an ester group, an amide group, a silanol group and a silyl ether group. The alkylene oxide unit more preferably contains three or more of the above mentioned functional groups, which are the same or different from each other. It is still more preferred that the three or more functional groups contained in the alkylene oxide unit be the same, particularly in terms of flowability, mechanical properties, durability, heat resistance and productivity.

Preferred examples of the alkylene oxide unit contained in the above mentioned polyol compound include aliphatic alkylene oxide units each having 1 to 4 carbon atoms. Specific examples thereof include methylene oxide unit, ethylene oxide unit, trimethylene oxide unit, propylene oxide unit, tetramethylene oxide unit, 1,2-butylene oxide unit, 2,3-butylene oxide unit, isobutylene oxide unit and the like.

In particular, it is preferred that a compound containing an ethylene oxide unit or a propylene oxide unit as the alkylene oxide unit be used, in terms of improving the flowability, recycling properties, durability, heat resistance and mechanical properties. Further, it is particularly preferred that a compound containing a propylene oxide unit be used, in terms of improving the long-term hydrolysis resistance and toughness (tensile elongation at break). The number of the alkylene oxide unit per one functional group is preferably 0.1 or more, more preferably, 0.5 or more, and still more preferably, 1 or more, in terms of improving the flowability. On the other hand, in terms of improving the mechanical properties, the number of the alkylene oxide unit per one functional group is preferably 20 or less, more preferably, 10 or less, and still more preferably, 5 or less.

In addition, the polyol compound may be reacted with the thermoplastic polyester resin (A) to be introduced into the main chain and side chains of the component (A) or, alternatively, the polyol compound may retain its original structure when it was added to the resin composition, without reacting with the (A) component.

The blending amount of the polyol compound containing the alkylene oxide unit having three or more functional groups is preferably 0.01 to 3 parts by weight with respect to 100 parts by weight of the thermoplastic polyester resin (A). The flowability of the resin composition can be improved when the blending amount of the polyol compound is 0.01 parts by weight or more. The blending amount is more preferably 0.05 parts by weight or more, and still more preferably, 0.1 parts by weight or more. On the other hand, the mechanical properties can be further improved when the blending amount of the polyol compound is 3 parts by weight or less. The blending amount is more preferably 2.0 parts by weight or less, and still more preferably, 1.5 parts by weight or less.

The thermoplastic polyester resin composition can further include a phosphorus-based flame retardant, a halogen-based flame retardant, a salt of a triazine compound and cyanuric acid or isocyanuric acid, a silicone-based flame retardant, an inorganic flame retardant and the like to the extent that the desired effect is not impaired.

The phosphorus-based flame retardant is a flame retardant containing a phosphorus component, and examples thereof include aromatic phosphoric acid ester compounds, phosphazene compounds, phosphaphenanthrene compounds, metal phosphinates, ammonium polyphosphates, melamine polyphosphates, phosphoric acid ester amides, red phosphorus and the like. Among these, an aromatic phosphoric acid ester compound, a phosphazene compound, a phosphaphenanthrene compound, and a metal phosphinate are preferably used. Two or more of these compounds may be included.

Examples of the aromatic phosphoric acid ester compound include resorcinol diphenyl phosphate, hydroquinone diphenyl phosphate, bisphenol A diphenyl phosphate, biphenyl diphenyl phosphate and the like. Examples of the commercially available product thereof include PX-202, CR-741, PX-200, and PX-201, manufactured by Daihachi Chemical Industry Co., Ltd.; and FP-500, FP-600, FP-700 and PFR, manufactured by ADEKA corporation and the like.

The phosphazene compound may be, for example, a phosphonitrile linear polymer and/or cyclic polymer. In particular, one comprising a linear phenoxyphosphazene as a major component is preferably used. The phosphazene compound can be synthesized by a generally known method disclosed, for example, in "Hosufazen Kagobutsu No Gosei To Oyo (Synthesis and Application of Phosphazene Compounds)" by Kajiwara. For example, the phosphazene compound can be synthesized by reacting phosphorus pentachloride or phosphorus trichloride as a phosphorus source with ammonium chloride or ammonia gas as a nitrogen source, using a known method (or by purifying a cyclic product), and then by subjecting the resulting substance to a substitution reaction with an alcohol, a phenol or an amine. As the commercially available product of the phosphazene compound, "RABITLE" (registered trademark) FP-110, manufactured by Fushimi Pharmaceutical Co., Ltd.; SPB-100 manufactured by Otsuka Chemical Co., Ltd. and the like are preferably used.

The phosphaphenanthrene compound is a phosphorus-based flame retardant containing at least one phosphaphenanthrene skeleton within its molecule. The examples of the commercially available product thereof include HCA, HCA-HQ, BCA, SANKO-220 and M-Ester, manufactured by Sanko Co., Ltd. and the like. In particular, M-Ester is preferably used, because the reaction between its terminal hydroxyl groups and the terminal of the thermoplastic polyester resin (A) can be expected during melt blending, and thus is effective for preventing the occurrence of bleed-out under high-temperature and high-humidity conditions.

The metal phosphinate is a metal phosphinate and/or a metal diphosphinate and/or a polymer thereof, and it is a compound useful as a flame retardant for the thermoplastic polyester resin (A). Examples thereof include salts of calcium, aluminum, and zinc. Examples of the commercially available product of the metal phosphinate include "EXOLIT" (registered trademark) OP1230 and OP1240, manufactured by Clariant Japan K. K. and the like.

The phosphoric acid ester amide is an aromatic amide-based flame retardant containing a phosphorus atom and a nitrogen atom. Since the phosphoric acid ester amide is a substance with a high melting point which is in the form of a powder at normal temperature, it has an excellent handleability during blending, and is capable of improving the heat distortion temperature of the resulting molded article. As the commercially available product of the phosphoric acid ester amide, SP-703 manufactured by Shikoku Chemicals Corporation is preferably used.

Examples of the ammonium polyphosphate include ammonium polyphosphate, melamine-modified ammonium polyphosphate, ammonium carbamylpolyphosphate and the like. The ammonium polyphosphate may be coated with a thermosetting resin such as a phenol resin, a urethane resin, a melamine resin, a urea resin, an epoxy resin, or a urea resin, which exhibits thermosetting properties.

Examples of the melamine polyphosphate include phosphorus atom melamine phosphate, melamine pyrophosphate, and other melamine polyphosphates produced with melamine, melam, or melem. Preferred examples of the commercially available product thereof include "MPP-A" manufactured by Sanwa Chemical Co., Ltd.; PMP-100 and PMP-200 manufactured by Nissan Chemical Industries, Ltd. and the like.

As the red phosphorus, not only untreated red phosphorus, but also red phosphorus treated with a compound film(s) such as a thermosetting resin film, a metal hydroxide film, and/or a metal plating film can be preferably used. Examples of the thermosetting resin to be used for the thermosetting resin film include phenol-formalin resins, urea-formalin resins, melamine-formalin resins, alkyd resins and the like. Examples of the metal hydroxide to be used for the metal hydroxide film include aluminum hydroxide, magnesium hydroxide, zinc hydroxide, titanium hydroxide and the like. The metal to be used for the metal plating film is not particularly limited as long as it is capable of coating the red phosphorus, and examples thereof include Fe, Ni, Co, Cu, Zn, Mn, Ti, Zr, Al, and alloys thereof. These films may be composed of two or more of the above mentioned components, or may be a laminate of two or more layers.

The blending amount of the phosphorus-based flame retardant is preferably 1 to 40 parts by weight with respect to 100 parts by weight of the thermoplastic polyester resin (A). The flame retardancy of the resin composition and the resulting molded article can be improved when the blending amount of the phosphorus-based flame retardant is 1 part by weight or more. The blending amount is more preferably 3 parts by weight or more, and still more preferably, 10 parts by weight or more. On the other hand, when the blending amount of the phosphorus-based flame retardant is 40 parts by weight or less, it is possible to prevent the occurrence of bleed-out, a phenomenon in which the phosphorus-based flame retardant deposits on the surface of the molded article. The blending amount is more preferably 35 parts by weight or less.

Specific examples of the halogen-based flame retardant include: decabromodiphenyl oxide, octabromodiphenyl oxide, tetrabromodiphenyl oxide, tetrabromophthalic anhydride, hexabromocyclododecane, bis(2,4,6-tribromophenoxy)ethane, ethylene bistetrabromophthalimide, hexabromobenzene, 1,1-sulfonyl[3,5-dibromo-4-(2,3-dibromopropoxy)]benzene, polydibromophenylene oxide, tetrabromobisphenol-S, tris(2,3-dibromopropyl-1)isocyanurate, tribromophenol, tribromophenyl allyl ether, tribromoneopentyl alcohol, brominated polystyrene, brominated polyethylene, tetrabromobisphenol-A, tetrabromobisphenol-A derivatives, tetrabromobisphenol-A-epoxy oligomers and polymers, tetrabromobisphenol-A-carbonate oligomers and polymers, brominated epoxy resins such as brominated phenol novolac epoxy, tetrabromobisphenol-A-bis(2-hydroxydiethyl ether), tetrabromobisphenol-A-bis(2,3-dibromopropyl ether), tetrabromobisphenol-A-bis(allyl ether), tetrabromocyclooctane, ethylene bispentabromodiphenyl, tris(tribromoneopentyl)phosphate, poly(pentabromobenzyl polyacrylate), octabromotrimethylphenyl indan, dibromoneopentyl glycol, pentabromobenzyl polyacrylate, dibromocresyl glycidyl ether, N,N'-ethylene-bistetrabromophthalimide and the like. Among these, a tetrabromobisphenol-A-epoxy oligomer, a tetrabromobisphenol-A-carbonate oligomer and a brominated epoxy resin are preferably used.

The blending amount of the halogen-based flame retardant is preferably 1 to 50 parts by weight with respect to 100 parts by weight of the thermoplastic polyester resin (A). The flame retardancy of the resin composition and the resulting molded article can be improved when the blending amount of halogen-based flame retardant is 1 part by weight. The blending amount is more preferably 2 parts by weight or more, and still more preferably, 3 parts by weight or more. On the other hand, when the blending amount of the halogen-based flame retardant is 50 parts by weight or less, it is possible to prevent the occurrence of bleed-out, a phenomenon in which the halogen-based flame retardant deposits on the surface of the molded article. The blending amount is more preferably 45 parts by weight or less, and still more preferably, 40 parts by weight or less.

The salt of a triazine compound and cyanuric acid or isocyanuric acid is a nitrogen-containing heterocyclic compound having a triazine skeleton, and melamine cyanurate and melamine isocyanurate are preferably used. The incorporation of such a compound serves to further improve the flame retardancy of the resin composition and the resulting molded article, due to its cooling effect. Two or more of these compounds may be included.

The melamine cyanurate or the melamine isocyanurate is preferably an adduct of cyanuric acid or isocyanuric acid with a triazine compound, usually with a composition ratio of 1:1 (molar ratio), and in some cases, 1:2 (molar ratio). The melamine cyanurate or the melamine isocyanurate can be produced by an arbitrary method. For example, a mixture of melamine and cyanuric acid or isocyanuric acid is formed into a water slurry, and after sufficiently mixing the slurry to produce their salt in the form of microparticles, the resulting slurry is filtered and dried to obtain the desired product, generally, in the form of a powder. The above mentioned salt does not have to be completely pure, and some melamine, or some cyanuric acid or isocyanuric acid may remain unreacted. Further, a dispersant such as tris(β-hydroxyethyl) isocyanurate or a well-known surface treating agent such as polyvinyl alcohol and a metal oxide such as silica may be used to improve the dispersibility. The melamine cyanurate or the melamine isocyanurate preferably has an average particle size of 0.1 to 100 μm at both before and after being added to the resin, in terms of the flame retardancy, mechanical strength and surface properties of the molded article. The average particle size is more preferably 0.2 μm or more, and still more preferably, 0.3 μm or more. The average particle size is more preferably 50 μm or less, and still more preferably, 10 μm or less. The average particle size as used herein is a particle size corresponding to 50% of the cumulative distribution, as measured by laser micron sizer method. As the commercially available product of the salt of a triazine compound and cyanuric acid or isocyanuric acid, MC-4000, MC-4500 and MC-6000 manufactured by Nissan Chemical Industries, Ltd. and the like are preferably used.

The blending amount of the salt of a triazine compound and cyanuric acid or isocyanuric acid is preferably 1 to 50 parts by weight with respect to 100 parts by weight of the thermoplastic polyester resin (A) in terms of the flame retardancy and tensile properties. The flame retardancy of the resin composition and the resulting molded article can be improved when the blending amount of the salt of a triazine compound and cyanuric acid or isocyanuric acid is 1 part by weight or more. The blending amount is more preferably 3 parts by weight or more, and still more preferably, 10 parts by weight or more. On the other hand, the tensile properties of the molded article can further be improved when the blending amount of the salt of a triazine compound and cyanuric acid or isocyanuric acid is 50 parts by weight or less. The blending amount is more preferably 45 parts by weight or less.

Examples of the silicone-based flame retardant include silicone resins and silicone oils. Examples of the silicone resin include resins having a three dimensional network structure formed by combining structural units such as $SiO_2$, $RSiO_{3/2}$, $R_2SiO$ and $R_3SiO_{1/2}$ and the like, wherein R represents an optionally substituted alkyl group or an aromatic hydrocarbon group. The alkyl group may be, for example, a methyl group, an ethyl group, or a propyl group; and the aromatic hydrocarbon group may be, for example, a phenyl group, or a benzyl group. The substituent group may be, for example, a vinyl group.

Examples of the silicone oil include polydimethylsiloxane; and modified polysiloxanes obtained by modifying at least one of the methyl groups on the side chains or terminals of the polydimethylsiloxane with at least one group selected from the group consisting of a hydrogen atom, an alkyl group, a cyclohexyl group, a phenyl group, a benzyl group, an amino group, an epoxy group, a polyether group, a carboxyl group, a mercapto group, a chloroalkyl group, an alkyl higher alcohol ester group, an alcohol group, an aralkyl group, a vinyl group and a trifluoromethyl group. Two or more of these compounds may be included.

Examples of the inorganic flame retardant include magnesium hydroxide hydrate, aluminum hydroxide hydrate, antimony trioxide, antimony pentaoxide, sodium antimonate, zinc hydroxystannate, zinc stannate, metastannic acid, tin oxide, tin oxide salt, zinc sulfate, zinc oxide, zinc borate, zinc borate hydrate, zinc hydroxide ferrous oxide, ferric oxide, sulfur sulfide, stannous oxide, stannic oxide, ammonium borate, ammonium octamolybdate, metal tungstates, complex oxides of tungsten and metalloid, ammonium sulfamate, zirconium compounds, graphite, expansive graphite and the like.

The inorganic flame retardant may be surface treated with a fatty acid or a silane coupling agent. Among the above mentioned inorganic flame retardants, zinc borate hydrate and expansive graphite are preferred in terms of the flame retardancy. Further, a mixture of magnesium oxide and aluminum oxide, zinc stannate, metastannic acid, tin oxide, zinc sulfate, zinc oxide, zinc borate, zinc ferrous oxide, ferric oxide and sulfur sulfide are particularly preferred for their excellent flame retardancy and retention stability.

The blending amount of the inorganic flame retardant is preferably 0.05 parts by weight or more, more preferably, 0.1 parts by weight or more, and still more preferably, 0.15 parts by weight or more, with respect to 100 parts by weight of the thermoplastic polyester resin (A), in terms of being able to provide the endothermic effect of combustion heat and the effect of preventing combustion. In terms of improving the mechanical properties, the blending amount of the inorganic flame retardant is preferably 4 parts by weight or less, more preferably, 3 parts by weight or less, and still more preferably, 2 parts by weight or less, with respect to 100 parts by weight of the thermoplastic polyester resin (A).

The thermoplastic polyester resin composition can further include a fluororesin. The incorporation of the fluororesin serves to prevent melt dripping during combustion and to improve the flame retardancy.

The fluororesin is a resin which contains fluorine in its molecule. Specific examples thereof include polytetrafluoroethylene, polyhexafluoropropylene, (tetrafluoroethylene/hexafluoropropylene) copolymers, (tetrafluoroethylene/perfluoroalkyl vinyl ether) copolymers, (tetrafluoroethylene/ethylene) copolymers, (hexafluoropropylene/propylene) copolymers, polyvinylidene fluoride, (vinylidene fluoride/ethylene) copolymers and the like.

Among these, polytetrafluoroethylene, a (tetrafluoroethylene/perfluoroalkyl vinyl ether) copolymer, a (tetrafluoroethylene/hexafluoropropylene) copolymer, a (tetrafluoroethylene/ethylene) copolymer, and polyvinylidene fluoride are preferred, and polytetrafluoroethylene and a (tetrafluoroethylene/ethylene) copolymer are particularly preferred.

The blending amount of the fluororesin is preferably 0.05 to 3 parts by weight with respect to 100 parts by weight of the thermoplastic polyester resin (A). The effect of preventing the melt dripping during combustion is improved when the blending amount is 0.05 parts by weight or more. The blending amount is more preferably 0.1 parts by weight or more, and still more preferably, 0.15 parts by weight or more. On the other hand, when the blending amount is 2 parts by weight or less, the mechanical properties are further improved. The blending amount is more preferably 2 parts by weight or less, and still more preferably, 1.5 parts by weight or less.

The thermoplastic polyester resin composition can further include a mold release agent. By including the mold release agent, the releasability during injection molding can be improved. The mold release agent may be a known mold release agent for plastic materials, for example, a fatty acid amide such as ethylene bisstearylamide; a fatty acid amide comprising a polycondensate of ethylenediamine with stearic acid and sebacic acid or a polycondensate of phenylenediamine with stearic acid and sebacic acid; a polyalkylene wax, an acid anhydride-modified polyalkylene wax, and a mixture of the above mentioned lubricant with a fluororesin or fluorine-based compound.

The blending amount of the mold release agent is preferably 0.01 to 1 part by weight with respect to 100 parts by weight of the thermoplastic polyester resin (A). A sufficient mold releasing effect can be obtained when the blending amount is 0.01 parts by weight or more. The blending amount is more preferably 0.02 parts by weight or more, and still more preferably 0.03 parts by weight or more. On the other hand, the mechanical properties are further improved when the blending amount is 1 part by weight or less. The blending amount is more preferably 0.8 parts by weight or less, and still more preferably, 0.6 parts by weight or less.

The thermoplastic polyester resin composition can further include a fiber reinforcement, to the extent that the desired effect is not impaired. Incorporation of the fiber reinforcement serves to further improve mechanical strength and heat resistance.

Specific examples of the fiber reinforcement include glass fibers, aramid fibers, carbon fibers and the like. As the glass fiber, a chopped strand-type or a robing-type glass fiber, treated with a silane coupling agent and/or a binder, is preferably used. Preferred silane coupling agents include aminosilane compounds and epoxysilane compounds. Preferred binders include urethane; vinyl acetate; epoxy compounds such as bisphenol A diglycidyl ether and novolac-type epoxy compounds and the like. The fiber reinforcement preferably has a fiber diameter of 1 to 30 and more preferably, a fiber diameter of 5 to 15 The fiber reinforcement usually has a circular cross section. However, it is possible to use a fiber reinforcement with a non-circular cross section, for example, a glass fiber with an elliptic cross section, a glass fiber with a flattened elliptic cross section, and a glass fiber with a dumbbell-shaped cross section, of an arbitrary aspect ratio. Use of the fiber reinforcement with a non-circular cross section allows for improving the flowability during injection molding, and for producing a molded article with less warpage.

The blending amount of the fiber reinforcement is preferably 1 to 100 parts by weight with respect to 100 parts by weight of the thermoplastic polyester resin (A). The mechanical strength and the heat resistance can further be improved when the blending amount of the fiber reinforcement is 1 part by weight or more. The blending amount is more preferably 2 parts by weight or more, and still more preferably, 3 parts by weight or more. When the blending amount of the fiber reinforcement is 100 parts by weight or less, as well, the mechanical strength and the heat resistance can further be improved. The blending amount is more preferably 95 parts by weight or less, and still more preferably, 90 parts by weight or less.

The thermoplastic polyester resin composition can further include an inorganic filler other than the fiber reinforcement. Incorporation of the inorganic filler other than the fiber reinforcement serves to partially improve the crystallization characteristics, arc-resistance, anisotropy, mechanical strength, flame retardancy or heat distortion temperature of the resulting molded article. Since the inorganic filler other than the fiber reinforcement is effective particularly in reducing the anisotropy, a molded article with less warpage can be obtained.

Examples of the inorganic filler other than the fiber reinforcement include inorganic fillers in the form of needles, granules, powders and layers. Specific examples thereof include glass beads, milled fibers, glass flakes, potassium titanate whiskers, calcium sulfate whiskers, wollastonite, silica, kaolin, talc, calcium carbonate, zinc oxide, magnesium oxide, aluminum oxide, a mixture of magnesium oxide and aluminum oxide, silicic acid fine powder, aluminum silicate, silicon oxide, smectite clay minerals (montmorillonite, hectorite, etc.) vermiculite, mica, fluorine taeniolite, zirconium phosphate, titanium phosphate, dolomite and the like. Two or more of these may be included. The use of milled fibers, glass flakes, kaolin, talc and/or mica allows for providing a molded article with less warpage, because they are effective in reducing anisotropy. Further, when calcium carbonate, zinc oxide, magnesium oxide, aluminum oxide, a mixture of magnesium oxide and aluminum oxide, silicic acid fine powder, aluminum silicate and/or silicon oxide are/is included in an amount of 0.01 to 1 part by weight with respect to 100 parts by weight of the thermoplastic polyester resin (A), the retention stability can further be improved.

In addition, the inorganic filler other than the fiber reinforcement may be surface treated with a coupling agent, an epoxy compound, or by ionization. The inorganic filler in the form of granules, powders and layers preferably have an average particle size of 0.1 to 20 µm, and particularly preferably, 0.2 to 10 µm, in terms of improving the impact strength. The blending amount of the inorganic filler other than the fiber reinforcement, combined with the blending amount of the fiber reinforcement, is preferably 100 parts by weight or less with respect to 100 parts by weight of the thermoplastic polyester resin (A), in terms of improving the flowability during molding and the durability of the molding machine and mold. Further, the blending amount of the inorganic filler other than the fiber reinforcement is preferably 1 to 50 parts by weight with respect to 100 parts by weight of the thermoplastic polyester resin (A). When the blending amount of the inorganic filler other than the fiber reinforcement is 1 part by weight or more, it is possible to reduce the anisotropy and to further improve the retention stability. The blending amount is more preferably 2 parts by weight or more, and still more preferably, 3 parts by weight or more. On the other hand, the mechanical strength can be improved when the blending amount of the inorganic filler other than the fiber reinforcement is 50 parts by weight or less.

The thermoplastic polyester resin composition can further include an antioxidant. By including the antioxidant, an excellent heat aging resistance can be provided, such that the resin composition and the resulting molded article can endure exposure to high temperature for an extended period of time. Examples of the antioxidant include hindered phenol antioxidants, thioether antioxidants and the like. Two or more of these may be included.

The blending amount of the antioxidant is preferably 0.01 parts by weight or more with respect to 100 parts by weight of the thermoplastic polyester resin (A), more preferably, 0.02 parts by weight or more, and still more preferably, 0.03 parts by weight or more, in terms of improving the heat aging resistance. Further, the blending amount of the antioxidant is preferably, 2 parts by weight or less, more preferably, 1.5 parts by weight or less, and still more preferably, 1 part by weight or less, in terms of improving the mechanical properties.

The thermoplastic polyester resin composition can further include one or more of carbon black, titanium oxide and various types of color pigments and dyes. By including such a pigment or dye, it is possible to adjust the color of the resin composition and the resulting molded article to various types of colors, and to improve the weatherability (light resistance) and electrical conductivity thereof.

The blending amount of the pigment or dye is preferably 0.01 to 3 parts by weight with respect to 100 parts by weight of the thermoplastic polyester resin (A). When the blending amount is 0.01 parts by weight, the effect of improving the color adjustment, weatherability (light resistance) and electrical conductivity can be obtained. The blending amount is more preferably 0.02 parts by weight or more, and still more preferably, 0.03 parts by weight or more. On the other hand, the mechanical properties are further improved when the blending amount is 3 parts by weight or less. The blending amount is more preferably 2 parts by weight or less, and still more preferably, 1 part by weight or less.

Examples of the carbon black include channel black, furnace black, acetylene black, anthracene black, lamp black, soot of burnt pine, graphite and the like. The carbon black to be used preferably has an average particle size of 500 nm or less, and a dibutyl phthalate absorption of 50 to 400 $cm^3/100$ g. The carbon black may be surface treated with aluminum oxide, silicon oxide, zinc oxide, zirconium oxide, a polyol, a silane coupling agent or the like.

As the titanium oxide, one having a rutile-type or anatase-type crystalline structure, and an average particle size of 5 µm or less is preferably used. The titanium oxide may be treated with aluminum oxide, silicon oxide, zinc oxide, zirconium oxide, a polyol, a silane coupling agent or the like.

Further, the above mentioned carbon black, titanium oxide and various types of color pigments and dyes may be used in the form of a mixture with various types of thermoplastic resins, obtained by melt blending, or by simply blending these components to improve the dispersibility of such pigments and dyes in the thermoplastic polyester resin composition, and the handleability during the production process.

The method of producing the thermoplastic polyester resin composition will now be described. The thermoplastic polyester resin composition can be obtained, for example, by melt blending the component (A), component (B), and other components, as required.

Examples of the method of melt blending include: a method in which the thermoplastic polyester resin (A), the novolac type epoxy resin (B) represented by formula (1), as well as the phosphorus-based stabilizer (C), the monofunctional epoxy compound (D), the reaction catalyst (E) and various types of additives, as required, are premixed, and the resulting mixture is then fed to an extruder or the like to be sufficiently melt blended; a method in which a specified amount of each of the components is fed to an extruder or the like, using a metering feeder such as a weight feeder, to be sufficiently melt blended and the like.

The premixing can be carried out, for example, by dry blending; or by utilizing a mechanical mixing apparatus such as a tumble mixer, a ribbon mixer or a Henschel mixer. Alternatively, the fiber reinforcement and the inorganic filler other than the fiber reinforcement may be fed through a side feeder installed between the feeding portion and the vent portion of a multi-screw extruder such as a twin-screw extruder. When a liquid additive is used, the additive may be fed, for example, through a liquid feeding nozzle installed between the feeding portion and the vent portion of a multi-screw extruder such as a twin-screw extruder, using a plunger pump; or through the feeding portion or the like, using a metering pump.

It is preferred that the thermoplastic polyester resin composition be formed into pellets first and then the pellets be subjected to molding processing. Formation of pellets can be carried out, for example, by extruding the thermoplastic polyester resin composition in the form of strands using a single-screw extruder, a twin-screw extruder, a triple-screw extruder, a conical extruder or a kneader-type mixer, equipped with Uni-melt" or "Dulmage" type screw, and then by cutting the resulting strands using a strand cutter.

By melt-molding the thermoplastic polyester resin composition, it is possible to obtain a molded article in the form of a film, fiber, and other various types of shapes. Examples of the melt-molding method include methods such as injection molding, extrusion molding, blow molding and the like. Injection molding is particularly preferably used.

In addition to a regular injection molding method, other types of injection molding methods are also known such as gas assisted molding, two-color molding, sandwich molding, in-mold molding, insert molding, injection press molding and the like, and the resin composition can be prepared using any of the methods.

The molded article can be suitably used for mechanical machine parts, electric components, electronic components and automotive parts, utilizing its excellent mechanical properties such as long-term hydrolysis resistance, tensile strength and elongation, and excellent heat resistance. Further, the molded article obtained from the thermoplastic polyester resin composition is useful particularly as outer layer components because of its excellent long-term hydrolysis resistance.

Specific examples of the mechanical machine parts, electric components, electronic component and automotive parts include: breakers, electromagnetic switches, focus cases, flyback transformers, molded articles for fusers of copying machines and printers, general household electrical appliances, housings of office automation equipment, parts of variable capacitor case, various types of terminal boards, transformers, printed wiring boards, housings, terminal blocks, coil bobbins, connectors, relays, disk drive chassis, transformers, switch parts, wall outlet parts, motor components, sockets, plugs, capacitors, various types of casings, resistors, electric and electronic components into which metal terminals and conducting wires are incorporated, computer-related components, audio components such as acoustic components, parts of lighting equipment, telegraphic communication equipment-related components, telephone equipment-related components, components of air conditioners, components of consumer electronics such as VTR and TV, copying machine parts, facsimile machine parts, components of optical devices, components of automotive ignition system, connectors for automobiles, various types of automotive electrical components and the like.

EXAMPLES

The effects of the thermoplastic polyester resin composition will now be described specifically, by way of Examples. Raw materials to be used in the Examples and Comparative Examples will be shown below. Note that, all "%" and "part(s)" as used herein represent "% by weight" and "part(s) by weight", respectively, and "I" used in the names of the resins below indicates that the resin is a copolymer.

Thermoplastic Polyester Resin (A)

<A-1> Polybutylene terephthalate resin: a polybutylene terephthalate resin having a carboxyl end group concentration of 30 eq/t, manufactured by Toray Industries, Inc., was used.

<A-2> Polyethylene terephthalate resin: a polyethylene terephthalate resin having a carboxyl end group concentration of 40 eq/t, manufactured by Toray Industries, Inc., was used. Novolac type epoxy resin (B) represented by formula (1)

<B-1> Novolac type epoxy resin represented by formula (6) with an epoxy equivalent of 290 g/eq: "NC-3000H" manufactured by Nippon Kayaku Co., Ltd. was used.

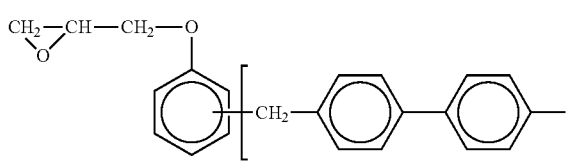
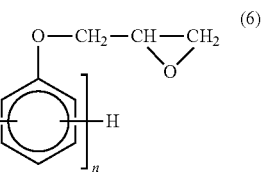

wherein in formula (6), n represents a value of from 2 to 4.

<B-2> Novolac type epoxy resin represented by formula (7) with an epoxy equivalent of 253 g/eq: "XD-1000" manufactured by Nippon Kayaku Co., Ltd. was used.

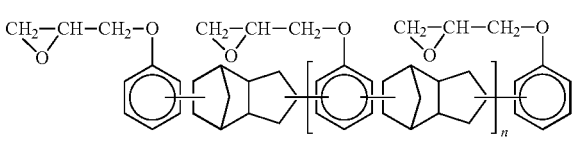

wherein in formula (7), n represents a value of from 1 to 3.

Novolac type epoxy resin (B') other than those represented by formula (1)

<B'-1> Novolac type epoxy resin represented by formula (8) with an epoxy equivalent of 211 g/eq: "EOCN-102S" manufactured by Nippon Kayaku Co., Ltd.

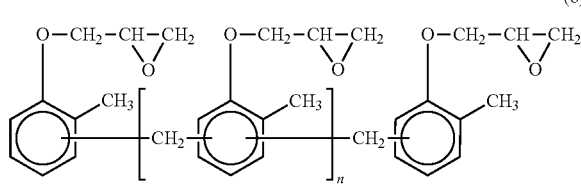

wherein in formula (8), n represents a value of from 3 to 5.

<B'-2> Novolac type epoxy resin represented by formula (9) with an epoxy equivalent of 237 g/eq: "NC-2000L" manufactured by Nippon Kayaku Co., Ltd. was used.

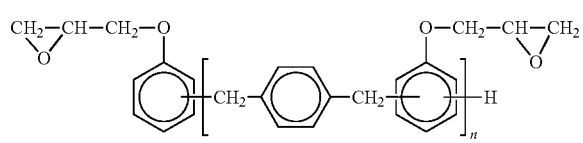

wherein in formula (9), n represents a value of from 1 to 5.

Phosphorus-Based Stabilizer (C)

<C-1> Bis(2,6-di-t-butyl-4-methylphenyl)pentaerythritol diphosphite: "ADEKASTAB" (registered trademark) PEP36, manufactured by ADEKA Corporation, was used.

<C-2> Tetrakis(2,4-di-t-butylphenyl)-4,4'-biphenylene diphosphonite: "HOSTANOX" (registered trademark) P-EPQ, manufactured by Clariant Japan K. K., was used.

Monofunctional Epoxy Compound (D)

<D-1> Glycidyl versatate: "Cardula E10P", manufactured by Momentive special chemicals Inc., was used.

<D-2> Glycidyl 4-tert-butylbenzoate: (reagent) manufactured by Tokyo Chemical Industry Co., Ltd. was used.

Reaction Catalyst (E)

<E-1> Amidine compound: 1,8-diazabicyclo (5,4,0)undecene-7, "DBU" (registered trademark), with a molecular weight of 152, manufactured by San-Apro Ltd., was used.

<E-2> Imidazole: 2-ethyl-4-methylimidazole, "2E4MZ", with a molecular weight of 110.16, manufactured by Shikoku Chemicals Corporation, was used.

<E-3> Organic phosphine: triphenylphosphine; triphenylphosphine (reagent) with a molecular weight of 262.29, manufactured by Wako Pure Chemical Industries, Ltd., was used.

<E-4> Organic metal compound: lithium stearate; lithium stearate (reagent) with a molecular weight of 290.42, manufactured by Tokyo Chemical Industry Co., Ltd., was used.

Other Additives (F)

<F-1> Vinyl resin: a core-shell type silicone/acrylic composite rubber, "METABLEN" (registered trademark) S-2001 manufactured by Mitsubishi Rayon Co., Ltd., was used.

<F-2> Ethylene copolymer: an ethylene/butene-1/maleic anhydride copolymer, MH-5020 manufactured by Mitsui Petrochemical Industries, Ltd., was used.

<F-3> Hindered phenol antioxidant: tetrakis[methylene-3-(3',5'-di-t-butyl-4'-hydroxyphenyl)propionate]methane, "IRGANOX" (registered trademark) 1010 manufactured by BASF Japan Ltd., was used.

<F-4> Mold release agent: an ester wax of montanic acid, Lico wax E manufactured by Clariant Japan K. K., was used.

<F-5> Glass fiber: a chopped strand-type glass fiber with a fiber diameter of about 10 μm, 3J948 manufactured by Nitto Boseki Co., Ltd., was used.

<F-6> Bromine-based flame retardant: a tetrabromobisphenol-A-carbonate oligomer ("FIRE GUARD" (registered trademark) FG8500; manufactured by Teijin Chemicals Ltd.) was used.

<F-7> Polyol: polyoxypropylene trimethylolpropane (TMP-F32, manufactured by Nippon Nyukazai Co., Ltd.; molecular weight: 308, number of alkylene oxide (propylene oxide) units per one functional group: 1) was used.

Methods of Measuring Properties

In the Examples and Comparative Examples, the properties were evaluated according to the following measurement methods.

1. Blend Concentration of Carboxyl End Groups Derived from Thermoplastic Polyester Resin (A)

A solution obtained by dissolving the thermoplastic polyester resin (A) in a mixed solution of o-cresol/chloroform (2/1 vol) was titrated with 0.05 mol/L ethanolic potassium hydroxide, using 1% bromophenol blue as an indicator, and the concentration of the carboxyl end groups was calculated by the following equation. Blue (color D55-80 (2007 version, D-Pocket Type, published by Japan Paint Manufacturers Association)) was used as the end point of the titration.

The concentration of the carboxyl end groups [eq/g]=(the amount of 0.05 mol/L ethanolic potassium hydroxide [ml] required for the titration of the mixed solution of o-cresol/chloroform (2/1 vol) in which the component (A) is dissolved−the amount of 0.05 mol/L ethanolic potassium hydroxide [ml] required for the titration of the mixed solution of o-cresol/chloroform (2/1 vol))×the concentration of 0.05 mol/L ethanolic potassium hydroxide [mol/ml]×1/the amount of the component (A) [g] used in the titration.

The blend concentration of the carboxyl end groups derived from the component (A) in the thermoplastic polyester resin composition was calculated according to the following equation, from the concentration of the carboxyl end groups in the component (A) calculated based on the result of the above mentioned titration, and from the total amount of the thermoplastic polyester resin composition.

The blend concentration [eq/g] of the carboxyl end group derived from the component (A) in the thermoplastic polyester resin composition=(the concentration [eq/g] of the carboxyl end groups in the component (A)×the blending amount [parts by weight]) of the component (A)/the total amount of the thermoplastic polyester resin composition [parts by weight].

2. Blend Concentration of Epoxy Groups Derived from Novolac Type Epoxy Resin (B) Represented by Formula (1).

In accordance with JIS K7236: 2001, to a solution obtained by dissolving the novolac type epoxy resin (B) represented by formula (1) in chloroform, acetic acid and a solution of triethylammonium bromide in acetic acid were added, and the resultant was subjected to potentiometric titration with 0.1 mol/L perchloric acid-acetic acid, and the concentration of the epoxy groups was calculated according to the following equation.

The concentration of the epoxy groups [eq/g]=(the amount of 0.1 mol/L perchloric acid-acetic acid [ml] required for the titration of the solution obtained by dissolving the component (B) in chloroform and then by adding acetic acid and a solution of triethylammonium bromide in acetic acid to the resultant−the amount of 0.1 mol/L perchloric acid-acetic acid [ml] required for the titration of a solution obtained by adding acetic acid and a solution of triethylammonium bromide in acetic acid to chloroform)×the concentration of 0.1 mol/L perchloric acid-acetic acid [mol/ml]×1/the amount of the component (B) [g] used in the titration).

The concentration of the epoxy groups derived from the component (B) in the thermoplastic polyester resin composition was calculated, according to the following equation, from the concentration of the epoxy groups in the component (B) calculated based on the result of the above mentioned potentiometric titration, and from the total amount of the thermoplastic polyester resin composition.

The blend concentration of the epoxy groups derived from the component (B) [eq/g] in the thermoplastic polyester resin composition=(the concentration [eq/g] of the epoxy groups in the component (B)×the blending amount of the component (B) [parts by weight])/the total amount of the thermoplastic polyester resin composition [parts by weight].

For reference purposes, when the novolac type epoxy resin (B') other than those represented by formula (1) was used, the calculation was carried out by replacing the component (B) in the equation with the component (B').

3. Concentration of Reaction Catalyst

The concentration of the reaction catalyst in the thermoplastic polyester resin composition was calculated, according to the following equation, from the molecular weight and the blending amount of the reaction catalyst, and from the total amount of the thermoplastic polyester resin composition.

The blend concentration of the reaction catalyst [mol/g] in the thermoplastic resin composition=(1/the molecular weight of the component (E))×the blending amount of the component (E) [parts by weight]/the total amount of the thermoplastic polyester resin composition [parts by weight]).

4. Mechanical Properties (Tensile Properties)

The molding of the thermoplastic polyester resin composition was performed using an injection molding machine, IS55EPN, manufactured by Toshiba Machine Co., Ltd. When a polybutylene terephthalate resin was used as the component (A), the molding was performed under the conditions of a molding temperature of 250° C. and a mold temperature of 80° C.; and when a polyethylene terephthalate resin was used as the component (A), the molding was performed under the conditions of a molding temperature of 270° C., and a mold temperature of 80° C. Injection molding was carried out under the molding cycle conditions consisting of a 10-second period of injection and pressure dwelling in total, and a 10-second period of cooling, to prepare ASTM No. 1 dumbbell-shaped test specimens for evaluating the tensile properties, having a test specimen thickness of ⅛ inch (about 3.2 mm). The maximum tensile strength point (tensile strength) and the maximum tensile elongation point (tensile elongation) of the resulting test specimens for evaluating the tensile properties were measured, according to ASTM D638 (2005). For each of the tensile strength and tensile elongation, the mean of the measured values of the three test specimens was taken as the corresponding value. Materials with higher values of tensile strength and the tensile elongation are evaluated to have better mechanical properties.

5. Heat Resistance (Heat Distortion Temperature)

ASTM No. 1 dumbbell-shaped test specimens for evaluating the heat distortion temperature having a test specimen thickness of ⅛ inch (about 3.2 mm) were prepared, using an injection molding machine, IS55EPN, manufactured by Toshiba Machine Co., Ltd., under the same injection molding conditions as described for the preparation of the test specimens for evaluating the tensile properties in section 4. The heat distortion temperature of the resulting test specimens for evaluating the heat distortion temperature was measured, under the conditions of a measurement load of 1.82 MPa, according to ASTM D648 (2005). The mean of the measured values of the three test specimens was taken as the value of the heat distortion temperature. Materials having a heat distortion temperature of less than 50° C. were evaluated to have a poor heat resistance, and it was determined that the higher the value of the heat distortion temperature, the better the heat resistance of the material.

6. Long-Term Hydrolysis Resistance (Tensile Strength Retention)

ASTM No. 1 dumbbell-shaped test specimens for evaluating the tensile properties having a test specimen thickness of ⅛ inch (about 3.2 mm) were prepared using an injection molding machine, IS55EPN, manufactured by Toshiba Machine Co., Ltd., under the same injection molding conditions as described for the preparation of the test specimens for evaluating the tensile properties in section 4. The resulting ASTM No. 1 dumbbell-shaped specimens were placed in a highly accelerated stress test chamber, EHS-411 manufactured by ESPEC Corp., controlled at a temperature of 121° C. and a humidity of 100% RH, and subjected to heat-moisture treatment for 96 hours (four days). For the thermoplastic polyester resin composition including the glass fiber or the reaction catalyst (E), the heat-moisture treatment was continued for another 96 hours (four days) (192 hours (eight days) in total). The maximum tensile strength point of the molded articles after the heat-moisture treatment was measured under the same conditions as the tensile test described in section 4, and the mean of the measured values of the three test specimens was obtained. The tensile strength retention was calculated according to the following equation, from the maximum tensile strength point of the test specimens after the heat-moisture treatment, and from the maximum tensile strength point of the test specimens without the heat-moisture treatment.

Tensile strength retention (%)=(maximum tensile strength point after heat-moisture treatment÷maximum tensile strength point without heat-moisture treatment)×100

Materials having a tensile strength retention of less than 50% were evaluated to have a poor hydrolysis resistance, and it was determined that the higher the value of the tensile strength retention, the better the hydrolysis resistance.

7. Rate of Change in Melt Viscosity Index (Retention Stability)

The melt viscosity index (melt flow index) of the thermoplastic polyester resin composition was measured, using C501DOS manufactured by Toyo Seiki Co., Ltd., under the conditions of a temperature of 250° C. and a load of 2,160 g, in accordance with ASTM D1238 (1999).

Further, after retaining the thermoplastic polyester resin composition in a cylinder for 30 minutes, the melt viscosity index was measured under the same conditions, and the ratio (rate of change (%)) of the difference between the melt viscosity index before and after the retention, to the melt viscosity index before the retention, was obtained. When the rate of change in melt viscosity index is greater than 50%, the resin composition was evaluated to have a poor retention stability, and it was determined that the smaller the difference, the better the retention stability.

8. Color

ASTM No. 1 dumbbell-shaped test specimens for evaluating the color having a test specimen thickness of ⅛ inch (about 3.2 mm) were prepared using an injection molding machine, IS55EPN, manufactured by Toshiba Machine Co., Ltd., under the same injection molding conditions as described for the preparation of the test specimens for evaluating the tensile properties in section 4. The color of the resulting ASTM No. 1 dumbbell-shaped specimens was measured using a spectrophotometer SE2000 manufactured by Nippon Denshoku Industries Co., Ltd., and the degree of yellowing (YI value) was calculated. Materials having a degree of yellowing (YI value) of greater than 30 were evaluated to have a poor color, and it was determined that the lower the degree of yellowing (YI value), the better the color.

9. Concentration of Carboxyl End Groups with Respect to the Amount of Thermoplastic Polyester Resin (A) in Thermoplastic Polyester Resin Composition The concentration of the carboxyl end groups with respect to the amount of the thermoplastic polyester resin (A) in the thermoplastic polyester resin composition was obtained by: dissolving 2 g of the thermoplastic polyester resin composition in 50 mL of a mixed solution of o-cresol/chloroform (2/1 vol) to prepare a solution; titrating the solution with 0.05 mol/L ethanolic potassium hydroxide, using 1% bromophenol blue as an indicator to calculate the concentration of the carboxyl groups with respect to the total amount of the thermoplastic polyester resin composition; and then dividing the calculated concentration by the blending ratio of the thermoplastic polyester resin (A).

10. Concentration of Epoxy Groups in Thermoplastic Polyester Resin Composition

The concentration of the epoxy groups in the thermoplastic polyester composition was calculated by: dissolving 2 g of the thermoplastic polyester resin composition in 30 mL of a mixed solution of o-cresol/chloroform (2/1 vol) to prepare a solution; adding thereto 20 mL of acetic acid and 10 mL of a 20 wt % solution of triethylammonium bromide in acetic acid; and then subjecting the resulting solution to potentiometric titration with 0.1 mol/L perchloric acid-acetic acid.

11. Bleed-Out

ASTM No. 1 dumbbell-shaped test specimens for the evaluation of bleed-out having a test specimen thickness of ⅛ inch (about 3.2 mm) were prepared using an injection molding machine, IS55EPN, manufactured by Toshiba Machine Co., Ltd., under the same injection molding conditions as described for the preparation of the test specimens for evaluating the tensile properties in section 4. The thus obtained ASTM No. 1 dumbbell-shaped specimens were placed in a highly accelerated stress test chamber EHS-411 manufactured by ESPEC Corp., controlled at a temperature of 121° C. and a humidity of 100% RH, and subjected to heat-moisture treatment for 96 hours (four days). The appearance of the molded articles after the heat-moisture treatment was visually observed, and the evaluation of bleed-out was performed according to the following standards.

Good: No bleed-out of liquid or white powder is observed on the molded article.

Poor: Bleed-out of liquid or white powder is observed in some or many portions of the molded article.

Examples 1 to 84 and Comparative Examples 1 to 10

A co-rotating twin-screw extruder equipped with a vent (TEX-30α, manufactured by The Japan Steel Works, Ltd.) with a screw diameter of 30 mm and a L/D of 35 was used. In each of the Examples and Comparative Examples, the thermoplastic polyester resin (A), the novolac epoxy resin (B) or (B'), the phosphorus-based stabilizer (C), the monofunctional epoxy compound (D), the reaction catalyst (E), and materials other than glass fiber as required were mixed according to the composition ratios shown in Tables 1 to 16, and the resulting mixture was fed to the twin-screw extruder through its feeding portion. The glass fiber (F-5) was added through a side feeder installed between the feeding portion and the vent portion of the extruder, according to the composition ratios shown in Tables 2, 8 and 15. Melt blending was performed under the extrusion conditions of a kneading temperature of 260° C. and a screw rotational speed of 150 rpm. The resulting resin composition was extruded in the form of strands and passed through a cooling bath, and the resulting strands were then cut into pellets using a strand cutter.

The resulting pellets were dried in a hot air dryer controlled at a temperature of 110° C. for 6 hours. After drying, the dried pellets were evaluated according to the above mentioned methods. The results are shown in Tables 1 to 16. Note that, in Tables, the concentration of the carboxyl end groups with respect to the amount of the thermoplastic polyester resin (A) in the thermoplastic polyester resin composition is described as "Concentration of carboxyl end groups in the resin components in the resin composition".

TABLE 1

| Designation | Unit | Examples 1 | 2 | 3 | 4 | 5 | 6 | 7 |
|---|---|---|---|---|---|---|---|---|
| Thermoplastic polyester resin (A) | A-1 | Parts by weight | 100 | 100 | 100 | 100 | 100 | 100 | 100 |
| Novolac type epoxy resin (B) represented by formula (1) (X = (2)) | B-1 | Parts by weight | 0.9 | 1.7 | — | 3.5 | 5.2 | 7.0 | 8.7 |
| Novolac type epoxy resin (B) represented by formula (1) (X = (3)) | B-2 | Parts by weight | — | — | 1.5 | — | — | — | — |
| Blend concentration of epoxy groups derived from (B)/Blend concentration of carboxyl end groups derived from (A) | — | | 1 | 2 | 2 | 4 | 6 | 8 | 10 |
| Tensile strength | | MPa | 61 | 60 | 58 | 60 | 58 | 58 | 53 |
| Tensile elongation | | % | 6.33 | 6.39 | 4.89 | 6.39 | 6.26 | 4.27 | 4.19 |
| Heat distortion temperature | | °C. | 56 | 57 | 56 | 57 | 54 | 54 | 51 |
| Tensile strength retention four days after the heat-moisture treatment | | % | 53 | 61 | 55 | 60 | 61 | 63 | 63 |
| Rate of change in melt viscosity index | | % | 36 | 28 | 36 | 34 | 36 | 38 | 39 |
| Degree of yellowing (YI) | | — | 30 | 33 | 35 | 36 | 39 | 40 | 42 |
| Concentration of carboxyl end groups in the resin components in the resin composition | | eq/t | 18 | 15 | 16 | 13 | 12 | 11 | 10 |
| Concentration of epoxy groups in the resin composition | | eq/t | 17 | 41 | 42 | 98 | 150 | 205 | 254 |
| Bleed out | | Visual observation | Good | Good | Good | Good | Good | Good | Good |

TABLE 2

| Designation | Unit | Examples 8 | 9 |
|---|---|---|---|---|
| Thermoplastic polyester resin (A) | A-1 | Parts by weight | 100 | 100 |
| Novolac type epoxy resin (B) represented by formula (1) (X = (2)) | B-1 | Parts by weight | 1.7 | — |
| Novolac type epoxy resin (B) represented by formula (1) (X = (3)) | B-2 | Parts by weight | — | 1.5 |
| (F) Glass fiber | F-5 | Parts by weight | 40 | 40 |
| Blend concentration of epoxy groups derived from (B)/Blend concentration of carboxyl end groups derived from (A) | — | | 2 | 2 |
| Tensile strength | | MPa | 150 | 148 |
| Tensile elongation | | % | 3.82 | 3.75 |
| Heat distortion temperature | | °C. | 213 | 213 |
| Tensile strength retention four days after the heat-moisture treatment | | % | 92 | 89 |
| Tensile strength retention eight days after the heat-moisture treatment | | % | 61 | 58 |
| Rate of change in melt viscosity index | | % | 6 | 8 |
| Degree of yellowing (YI) | | — | 31 | 32 |
| Concentration of carboxyl end groups in the resin components in the resin composition | | eq/t | 13 | 14 |
| Concentration of epoxy groups in the resin composition | | eq/t | 24 | 23 |
| Bleed out | | Visual observation | Good | Good |

TABLE 3

| | Designation | Unit | Examples 10 | 11 | 12 | 13 | 14 | 15 | 16 | 17 | 18 |
|---|---|---|---|---|---|---|---|---|---|---|---|
| Thermoplastic polyester resin (A) | A-1 | Parts by weight | 100 | 100 | 100 | 100 | — | 100 | 100 | 100 | 100 |
| Thermoplastic polyester resin (A) | A-2 | Parts by weight | — | — | — | — | 100 | — | — | — | — |
| Novolac type epoxy resin (B) represented by formula (1) (X = (2)) | B-1 | Parts by weight | 0.9 | 1.7 | 1.7 | 1.7 | 2.3 | — | 1.7 | 1.7 | 1.7 |

TABLE 3-continued

|  | Designation | Unit | Examples | | | | | | | | |
| --- | --- | --- | --- | --- | --- | --- | --- | --- | --- | --- | --- |
|  |  |  | 10 | 11 | 12 | 13 | 14 | 15 | 16 | 17 | 18 |
| Novolac type epoxy resin (B) represented by formula (1) (X = (3)) | B-2 | Parts by weight | — | — | — | — | — | 1.5 | — | — | — |
| Amidine compound (E) | E-1 | Parts by weight | 0.030 | 0.008 | 0.015 | 0.030 | 0.030 | 0.030 | — | — | — |
| Imidazole (E) | E-2 | Parts by weight | — | — | — | — | — | — | 0.022 | — | — |
| Organic phosphine (E) | E-3 | Parts by weight | — | — | — | — | — | — | — | 0.053 | — |
| Organic metal compound (E) | E-4 | Parts by weight | — | — | — | — | — | — | — | — | 0.058 |
| Blend concentration of epoxy groups derived from (B)/Blend concentration of carboxyl end groups derived from (A) | — |  | 1 | 2 | 2 | 2 | 2 | 2 | 2 | 2 | 2 |
| Blend concentration of (E)/Blend concentration of epoxy groups derived from (B) | — |  | 0.06 | 0.01 | 0.02 | 0.03 | 0.02 | 0.03 | 0.03 | 0.03 | 0.03 |
| Tensile strength |  | MPa | 57 | 56 | 56 | 56 | 54 | 56 | 57 | 56 | 56 |
| Tensile elongation |  | % | 7.32 | 7.48 | 7.55 | 7.39 | 4.64 | 7.41 | 7.73 | 7.15 | 7.17 |
| Heat distortion temperature |  | ° C. | 62 | 60 | 60 | 60 | 65 | 60 | 60 | 58 | 62 |
| Tensile strength retention four days after the heat-moisture treatment |  | % | 98 | 100 | 100 | 100 | 100 | 100 | 100 | 100 | 99 |
| Tensile strength retention eight days after the heat-moisture treatment |  | % | 58 | 71 | 80 | 91 | 90 | 86 | 75 | 78 | 68 |
| Rate of change in melt viscosity index |  | % | 30 | 25 | 21 | 13 | 26 | 26 | 28 | 27 | 29 |
| Degree of yellowing (YI) |  | — | 32 | 34 | 34 | 35 | 38 | 37 | 37 | 37 | 37 |
| Concentration of carboxyl end groups in the resin components in the resin composition |  | eq/t | 7 | 8 | 5 | 2 | 3 | 4 | 5 | 5 | 6 |
| Concentration of epoxy groups in the resin composition |  | eq/t | 7 | 33 | 31 | 28 | 38 | 31 | 30 | 30 | 31 |
| Bleed out |  | Visual observation | Good | Good | Good | Good | Good | Good | Good | Good | Good |

TABLE 4

|  | Designation | Unit | Examples | | | | | | |
| --- | --- | --- | --- | --- | --- | --- | --- | --- | --- |
|  |  |  | 19 | 20 | 21 | 22 | 23 | 24 | 25 |
| Thermoplastic polyester resin (A) | A-1 | Parts by weight | 100 | 100 | 100 | 100 | 100 | 100 | 100 |
| Thermoplastic polyester resin (A) | A-2 | Parts by weight | — | — | — | — | — | — | — |
| Novolac type epoxy resin (B) represented by formula (1) (X = (2)) | B-1 | Parts by weight | 1.7 | 1.7 | 1.7 | 3.5 | 5.2 | 7.0 | 8.7 |
| Novolac type epoxy resin (B) represented by formula (1) (X = (3)) | B-2 | Parts by weight | — | — | — | — | — | — | — |
| Amidine compound (E) | E-1 | Parts by weight | 0.046 | 0.061 | 0.091 | 0.030 | 0.030 | 0.030 | 0.300 |
| Imidazole (E) | E-2 | Parts by weight | — | — | — | — | — | — | — |
| Organic phosphine (E) | E-3 | Parts by weight | — | — | — | — | — | — | — |
| Organic metal compound (E) | E-4 | Parts by weight | — | — | — | — | — | — | — |
| Blend concentration of epoxy groups derived from (B)/Blend concentration of carboxyl end groups derived from (A) |  | — | 2 | 2 | 2 | 4 | 6 | 8 | 10 |
| Blend concentration of (E)/Blend concentration of epoxy groups derived from (B) |  | — | 0.05 | 0.07 | 0.10 | 0.02 | 0.01 | 0.01 | 0.07 |
| Tensile strength |  | MPa | 56 | 57 | 57 | 57 | 58 | 58 | 54 |
| Tensile elongation |  | % | 7.24 | 7.49 | 7.56 | 7.32 | 7.35 | 4.19 | 4.15 |
| Heat distortion temperature |  | ° C. | 60 | 60 | 60 | 58 | 55 | 54 | 51 |
| Tensile strength retention four days after the heat-moisture treatment |  | % | 100 | 100 | 100 | 100 | 100 | 100 | 100 |
| Tensile strength retention eight days after the heat-moisture treatment |  | % | 90 | 82 | 76 | 95 | 97 | 97 | 96 |
| Rate of change in melt viscosity index |  | % | 10 | 5 | 23 | 25 | 33 | 36 | 35 |
| Degree of yellowing (YI) |  | — | 35 | 36 | 37 | 37 | 39 | 41 | 43 |
| Concentration of carboxyl end groups in the resin components in the resin composition |  | eq/t | 1 | 0 | 0 | 0 | 0 | 0 | 0 |

TABLE 4-continued

|  | Designation | Unit | Examples | | | | | | |
|---|---|---|---|---|---|---|---|---|---|
|  |  |  | 19 | 20 | 21 | 22 | 23 | 24 | 25 |
| Concentration of epoxy groups in the resin composition | | eq/t | 27 | 25 | 25 | 83 | 137 | 192 | 252 |
| Bleed out | | Visual observation | Good | Good | Good | Good | Good | Good | Good |

TABLE 5

|  | Designation | Unit | Examples | | | |
|---|---|---|---|---|---|---|
|  |  |  | 26 | 27 | 28 | 29 |
| Thermoplastic polyester resin (A) | A-1 | Parts by weight | 100 | 100 | 100 | 100 |
| Thermoplastic polyester resin (A) | A-2 | Parts by weight | — | — | — | — |
| Novolac type epoxy resin (B) represented by formula (1) (X = (2)) | B-1 | Parts by weight | 1.7 | 1.7 | 1.7 | 1.7 |
| Novolac type epoxy resin (B) represented by formula (1) (X = (3)) | B-2 | Parts by weight | — | — | — | — |
| Amidine compound (E) | E-1 | Parts by weight | 0.122 | 2.000 | 4.000 | 6.000 |
| Imidazole (E) | E-2 | Parts by weight | — | — | — | — |
| Organic phosphine (E) | E-3 | Parts by weight | — | — | — | — |
| Organic metal compound (E) | E-4 | Parts by weight | — | — | — | — |
| Blend concentration of epoxy groups derived from (B)/Blend concentration of carboxyl end groups derived from component (A) | | — | 2 | 2 | 2 | 2 |
| Blend concentration of (E)/Blend concentration of epoxy groups derived from (B) | | — | 0.14 | 2.24 | 4.49 | 6.73 |
| Tensile strength | | MPa | 57 | 56 | 54 | 48 |
| Tensile elongation | | % | 7.34 | 6.93 | 4.48 | 3.98 |
| Heat distortion temperature | | °C. | 60 | 59 | 57 | 57 |
| Tensile strength retention four days after the heat-moisture treatment | | % | 100 | 97 | 95 | 86 |
| Tensile strength retention eight days after the heat-moisture treatment | | % | 72 | 67 | 61 | 52 |
| Rate of change in melt viscosity index | | % | 27 | 32 | 37 | 43 |
| Degree of yellowing (YI) | | — | 38 | 39 | 41 | 44 |
| Concentration of carboxyl end groups in the resin components in the resin composition | | eq/t | 0 | 1 | 3 | 5 |
| Concentration of epoxy groups in the resin composition | | eq/t | 23 | 20 | 17 | 13 |
| Bleed out | | Visual observation | Good | Good | Good | Good |

TABLE 6

|  | Designation | Unit | Examples | | | | | |
|---|---|---|---|---|---|---|---|---|
|  |  |  | 30 | 31 | 32 | 33 | 34 | 35 |
| Thermoplastic polyester resin (A) | A-1 | Parts by weight | 100 | 100 | 100 | 100 | 100 | 100 |
| Novolac type epoxy resin (B) represented by formula (1) (X = (2)) | B-1 | Parts by weight | 0.9 | 1.7 | — | 3.5 | 5.2 | 1.7 |
| Novolac type epoxy resin (B) represented by formula (1) (X = (3)) | B-2 | Parts by weight | — | — | 1.5 | — | — | — |
| Phosphorus-based stabilizer (C) | C-1 | Parts by weight | 0.3 | 0.3 | 0.3 | 0.3 | 0.3 | 0.004 |
| Phosphorus-based stabilizer (C) | C-2 | Parts by weight | — | — | — | — | — | — |
| Blend concentration of epoxy groups derived from (B)/Blend concentration of carboxyl end groups derived from (A) | | — | 1 | 2 | 2 | 4 | 6 | 2 |

TABLE 6-continued

|  | | | | | | | |
|---|---|---|---|---|---|---|---|
| Tensile strength | | MPa | 61 | 60 | 58 | 60 | 58 | 60 |
| Tensile elongation | | % | 6.33 | 6.39 | 4.90 | 6.39 | 6.25 | 6.39 |
| Heat distortion temperature | | °C. | 57 | 57 | 56 | 57 | 55 | 57 |
| Tensile strength retention four days after the heat-moisture treatment | | % | 51 | 59 | 53 | 57 | 58 | 61 |
| Rate of change in melt viscosity index | | % | 37 | 30 | 37 | 35 | 36 | 30 |
| Degree of yellowing (YI) | | — | 16 | 18 | 20 | 21 | 23 | 31 |
| Concentration of carboxyl end groups in the resin components in the resin composition | | eq/t | 18 | 15 | 16 | 13 | 12 | 15 |
| Concentration of epoxy groups in the resin composition | | eq/t | 16 | 39 | 32 | 95 | 148 | 48 |
| Bleed out | | Visual observation | Good | Good | Good | Good | Good | Good |

| | Designa- | | Examples | | | | | |
|---|---|---|---|---|---|---|---|---|
| | tion | Unit | 36 | 37 | 38 | 39 | 40 | 41 |
| Thermoplastic polyester resin (A) | A-1 | Parts by weight | 100 | 100 | 100 | 100 | 100 | 100 |
| Novolac type epoxy resin (B) represented by formula (1) (X = (2)) | B-1 | Parts by weight | 1.7 | 1.7 | 1.7 | 1.7 | 1.7 | 1.7 |
| Novolac type epoxy resin (B) represented by formula (1) (X = (3)) | B-2 | Parts by weight | — | — | — | — | — | — |
| Phosphorus-based stabilizer (C) | C-1 | Parts by weight | 0.05 | 0.1 | 0.5 | 1 | 1.2 | — |
| Phosphorus-based stabilizer (C) | C-2 | Parts by weight | — | — | — | — | — | 0.3 |
| Blend concentration of epoxy groups derived from (B)/Blend concentration of carboxyl end groups derived from (A) | | — | 2 | 2 | 2 | 2 | 2 | 2 |
| Tensile strength | | MPa | 60 | 59 | 59 | 59 | 55 | 60 |
| Tensile elongation | | % | 6.39 | 6.39 | 6.28 | 6.20 | 5.99 | 6.40 |
| Heat distortion temperature | | °C. | 57 | 57 | 56 | 54 | 54 | 56 |
| Tensile strength retention four days after the heat-moisture treatment | | % | 61 | 60 | 55 | 51 | 45 | 60 |
| Rate of change in melt viscosity index | | % | 30 | 30 | 33 | 39 | 45 | 30 |
| Degree of yellowing (YI) | | — | 25 | 20 | 14 | 13 | 10 | 18 |
| Concentration of carboxyl end groups in the resin components in the resin composition | | eq/t | 15 | 15 | 15 | 15 | 16 | 15 |
| Concentration of epoxy groups in the resin composition | | eq/t | 39 | 39 | 39 | 39 | 38 | 39 |
| Bleed out | | Visual observation | Good | Good | Good | Good | Good | Good |

TABLE 7

| | Designa- | | Examples | | | | | | | |
|---|---|---|---|---|---|---|---|---|---|---|
| | tion | Unit | 42 | 43 | 44 | 45 | 46 | 47 | 48 | 49 |
| Thermoplastic polyester resin (A) | A-1 | Parts by weight | 100 | 100 | 100 | 100 | 100 | 100 | 100 | 100 |
| Novolac type epoxy resin (B) represented by formula (1) (X = (2)) | B-1 | Parts by weight | 0.9 | 1.7 | 1.7 | 3.5 | 1.7 | 1.7 | 1.7 | 1.7 |
| Novolac type epoxy resin (B) represented by formula (1) (X = (3)) | B-2 | Parts by weight | — | — | — | — | — | — | — | — |
| Phosphorus-based stabilizer (C) | C-1 | Parts by weight | 0.3 | 0.3 | 0.3 | 0.3 | 0.3 | 0.3 | 0.3 | 0.3 |
| Monofunctional epoxy compound (D) | D-1 | Parts by weight | 0.3 | 0.3 | — | 0.3 | 0.05 | 0.1 | 0.6 | 1 |
| Monofunctional epoxy compound (D) | D-2 | Parts by weight | — | — | 0.3 | — | — | — | — | — |
| Blend concentration of epoxy groups derived from (B)/Blend concentration of carboxyl end groups derived from (A) | | — | 1 | 2 | 2 | 4 | 2 | 2 | 2 | 2 |
| Tensile strength | | MPa | 61 | 60 | 61 | 59 | 60 | 60 | 58 | 55 |
| Tensile elongation | | % | 6.41 | 6.55 | 6.45 | 6.51 | 6.39 | 6.39 | 6.14 | 6.04 |

TABLE 7-continued

|  | Designation | Unit | Examples | | | | | | | |
| --- | --- | --- | --- | --- | --- | --- | --- | --- | --- | --- |
|  |  |  | 42 | 43 | 44 | 45 | 46 | 47 | 48 | 49 |
| Heat distortion temperature |  | °C. | 55 | 55 | 55 | 54 | 56 | 56 | 54 | 52 |
| Tensile strength retention four days after the heat-moisture treatment |  | % | 72 | 85 | 84 | 93 | 63 | 69 | 91 | 95 |
| Rate of change in melt viscosity index |  | % | 23 | 18 | 24 | 24 | 30 | 28 | 17 | 16 |
| Degree of yellowing (YI) |  | — | 17 | 19 | 21 | 24 | 18 | 18 | 20 | 21 |
| Concentration of carboxyl end groups in the resin components in the resin composition |  | eq/t | 12 | 8 | 9 | 7 | 12 | 10 | 5 | 4 |
| Concentration of epoxy groups in the resin composition |  | eq/t | 16 | 40 | 41 | 96 | 43 | 41 | 36 | 35 |
| Bleed out |  | Visual observation | Good | Good | Good | Good | Good | Good | Good | Good |

TABLE 8

|  | Designation | Unit | Examples | | |
| --- | --- | --- | --- | --- | --- |
|  |  |  | 50 | 51 | 52 |
| Thermoplastic polyester resin (A) | A-1 | Parts by weight | 100 | 100 | 100 |
| Novolac type epoxy resin (B) represented by formula (1) (X = (2)) | B-1 | Parts by weight | 1.7 | 1.7 | — |
| Novolac type epoxy resin (B) represented by formula (1) (X = (3)) | B-2 | Parts by weight | — | — | 1.5 |
| Phosphorus-based stabilizer (C) | C-1 | Parts by weight | 0.3 | 0.3 | 0.3 |
| Monofunctional epoxy compound (D) | D-1 | Parts by weight | — | 0.3 | 0.3 |
| (F) Glass fiber | F-5 | Parts by weight | 40 | 40 | 40 |
| Blend concentration of epoxy groups derived from (B)/ Blend concentration of carboxyl end groups derived from (A) | — |  | 2 | 2 | 2 |
| Tensile strength |  | MPa | 151 | 153 | 149 |
| Tensile elongation |  | % | 3.83 | 3.92 | 3.83 |
| Heat distortion temperature |  | °C. | 215 | 215 | 214 |
| Tensile strength retention four days after the heat-moisture treatment |  | % | 88 | 92 | 90 |
| Tensile strength retention eight days after the heat-moisture treatment |  | % | 55 | 61 | 59 |
| Rate of change in melt viscosity index |  | % | 10 | 2 | 1 |
| Degree of yellowing (YI) |  | — | 14 | 15 | 15 |
| Concentration of carboxyl end groups in the resin components in the resin composition |  | eq/t | 13 | 6 | 7 |
| Concentration of epoxy groups in the resin composition |  | eq/t | 24 | 31 | 30 |
| Bleed out |  | Visual observation | Good | Good | Good |

TABLE 9

|  | Designation | Unit | Examples | | | | | |
| --- | --- | --- | --- | --- | --- | --- | --- | --- |
|  |  |  | 53 | 54 | 55 | 56 | 57 | 58 |
| Thermoplastic polyester resin (A) | A-1 | Parts by weight | 100 | 100 | 100 | 100 | — | 100 |
| Thermoplastic polyester resin (A) | A-2 | Parts by weight | — | — | — | — | 100 | — |
| Novolac type epoxy resin (B) represented by formula (1) (X = (2)) | B-1 | Parts by weight | 0.9 | 1.7 | 1.7 | 1.7 | 2.3 | — |
| Novolac type epoxy resin (B) represented by formula (1) (X = (3)) | B-2 | Parts by weight | — | — | — | — | — | 1.5 |
| Phosphorus-based stabilizer (C) | C-1 | Parts by weight | 0.3 | 0.3 | 0.3 | 0.3 | 0.3 | 0.3 |
| Monofunctional epoxy compound (D) | D-1 | Parts by weight | 0.3 | 0.3 | 0.3 | 0.3 | 0.3 | 0.3 |

TABLE 9-continued

| | Designation | Unit | | | | | |
|---|---|---|---|---|---|---|---|
| Amidine compound (E) | E-1 | Parts by weight | 0.030 | 0.008 | 0.015 | 0.030 | 0.030 | 0.030 |
| Imidazole (E) | E-2 | Parts by weight | — | — | — | — | — | — |
| Organic phosphine (E) | E-3 | Parts by weight | — | — | — | — | — | — |
| Organic metal compound (E) | E-4 | Parts by weight | — | — | — | — | — | — |
| Blend concentration of epoxy groups derived from (B)/Blend concentration of carboxyl end groups derived from (A) | | — | — | 1 | 2 | 2 | 2 | 2 | 2 |
| Blend concentration of (E)/Blend concentration of epoxy groups derived from (B) | | — | — | 0.06 | 0.01 | 0.02 | 0.03 | 0.02 | 0.03 |
| Tensile strength | | MPa | 57 | 56 | 56 | 55 | 54 | 56 |
| Tensile elongation | | % | 7.33 | 7.48 | 7.54 | 7.20 | 4.63 | 7.42 |
| Heat distortion temperature | | ° C. | 62 | 60 | 59 | 58 | 66 | 60 |
| Tensile strength retention four days after the heat-moisture treatment | | % | 98 | 100 | 100 | 100 | 100 | 100 |
| Tensile strength retention eight days after the heat-moisture treatment | | % | 57 | 71 | 79 | 90 | 92 | 85 |
| Rate of change in melt viscosity index | | % | 5 | 14 | 8 | 2 | 8 | 3 |
| Degree of yellowing (YI) | | — | 17 | 18 | 18 | 19 | 21 | 17 |
| Concentration of carboxyl end groups in the resin components in the resin composition | | eq/t | 3 | 4 | 1 | 0 | 0 | 1 |
| Concentration of epoxy groups in the resin composition | | eq/t | 11 | 39 | 36 | 35 | 46 | 37 |
| Bleed out | | Visual observation | Good | Good | Good | Good | Good | Good |

| | Designation | Unit | Examples ||||| 
| | | | 59 | 60 | 61 | 62 | 63 |
|---|---|---|---|---|---|---|---|
| Thermoplastic polyester resin (A) | A-1 | Parts by weight | 100 | 100 | 100 | 100 | 100 |
| Thermoplastic polyester resin (A) | A-2 | Parts by weight | — | — | — | — | — |
| Novolac type epoxy resin (B) represented by formula (1) (X = (2)) | B-1 | Parts by weight | 1.7 | 1.7 | 1.7 | 1.7 | 1.7 |
| Novolac type epoxy resin (B) represented by formula (1) (X = (3)) | B-2 | Parts by weight | — | — | — | — | — |
| Phosphorus-based stabilizer (C) | C-1 | Parts by weight | 0.3 | 0.3 | 0.3 | 0.3 | 0.3 |
| Monofunctional epoxy compound (D) | D-1 | Parts by weight | 0.3 | 0.3 | 0.3 | 0.1 | 1.0 |
| Amidine compound (E) | E-1 | Parts by weight | — | — | — | 0.030 | 0.030 |
| Imidazole (E) | E-2 | Parts by weight | 0.022 | — | — | — | — |
| Organic phosphine (E) | E-3 | Parts by weight | — | 0.053 | — | — | — |
| Organic metal compound (E) | E-4 | Parts by weight | — | — | 0.058 | — | — |
| Blend concentration of epoxy groups derived from (B)/Blend concentration of carboxyl end groups derived from (A) | | — | 2 | 2 | 2 | 2 | 2 |
| Blend concentration of (E)/Blend concentration of epoxy groups derived from (B) | | — | 0.03 | 0.03 | 0.03 | 0.03 | 0.03 |
| Tensile strength | | MPa | 57 | 56 | 56 | 56 | 51 |
| Tensile elongation | | % | 7.74 | 7.15 | 7.16 | 7.32 | 6.99 |
| Heat distortion temperature | | ° C. | 60 | 58 | 62 | 59 | 53 |
| Tensile strength retention four days after the heat-moisture treatment | | % | 100 | 100 | 99 | 100 | 100 |
| Tensile strength retention eight days after the heat-moisture treatment | | % | 77 | 79 | 67 | 85 | 94 |
| Rate of change in melt viscosity index | | % | 4 | 5 | 6 | 8 | 1 |
| Degree of yellowing (YI) | | — | 18 | 18 | 18 | 19 | 21 |
| Concentration of carboxyl end groups in the resin components in the resin composition | | eq/t | 1 | 1 | 2 | 5 | 0 |

TABLE 9-continued

|  | | | | | | |
|---|---|---|---|---|---|---|
| Concentration of epoxy groups in the resin composition | eq/t | 36 | 36 | 37 | 40 | 35 |
| Bleed out | Visual observation | Good | Good | Good | Good | Good |

TABLE 10

|  | Designation | Unit | Examples | | | | | | |
|---|---|---|---|---|---|---|---|---|---|
|  |  |  | 64 | 65 | 66 | 67 | 68 | 69 | 70 |
| Thermoplastic polyester resin (A) | A-1 | Parts by weight | 100 | 100 | 100 | 100 | 100 | 100 | 100 |
| Thermoplastic polyester resin (A) | A-2 | Parts by weight | — | — | — | — | — | — | — |
| Novolac type epoxy resin (B) represented by formula (1) (X = (2)) | B-1 | Parts by weight | 1.7 | 1.7 | 1.7 | 3.5 | 5.2 | 7.0 | 8.7 |
| Novolac type epoxy resin (B) represented by formula (1) (X = (3)) | B-2 | Parts by weight | — | — | — | — | — | — | — |
| Phosphorus-based stabilizer (C) | C-1 | Parts by weight | 0.3 | 0.3 | 0.3 | 0.3 | 0.3 | 0.3 | 0.3 |
| Monofunctional epoxy compound (D) | D-1 | Parts by weight | 0.3 | 0.3 | 0.3 | 0.3 | 0.3 | 0.3 | 0.3 |
| Amidine compound (E) | E-1 | Parts by weight | 0.046 | 0.061 | 0.091 | 0.030 | 0.030 | 0.030 | 0.300 |
| Blend concentration of epoxy groups derived from (B)/Blend concentration of carboxyl end groups derived from (A) | — | — | 2 | 2 | 2 | 4 | 6 | 8 | 10 |
| Blend concentration of (E)/Blend concentration of epoxy groups derived from (B) | — | — | 0.05 | 0.07 | 0.10 | 0.02 | 0.01 | 0.01 | 0.07 |
| Tensile strength | — | MPa | 56 | 56 | 56 | 55 | 54 | 53 | 52 |
| Tensile elongation | — | % | 7.12 | 7.39 | 7.43 | 7.21 | 7.29 | 4.09 | 4.01 |
| Heat distortion temperature | — | °C. | 58 | 56 | 56 | 55 | 52 | 51 | 51 |
| Tensile strength retention four days after the heat-moisture treatment | — | % | 100 | 100 | 100 | 100 | 100 | 100 | 100 |
| Tensile strength retention eight days after the heat-moisture treatment | — | % | 89 | 85 | 81 | 96 | 98 | 98 | 96 |
| Rate of change in melt viscosity index | — | % | 2 | 4 | 7 | 14 | 17 | 20 | 23 |
| Degree of yellowing (YI) | — | — | 20 | 21 | 21 | 23 | 24 | 25 | 28 |
| Concentration of carboxyl end groups in the resin components in the resin composition | — | eq/t | 0 | 0 | 0 | 0 | 0 | 0 | 0 |
| Concentration of epoxy groups in the resin composition | — | eq/t | 34 | 34 | 34 | 93 | 146 | 202 | 252 |
| Bleed out | — | Visual observation | Good | Good | Good | Good | Good | Good | Good |

TABLE 11

|  | Designation | Unit | Examples | | | |
|---|---|---|---|---|---|---|
|  |  |  | 71 | 72 | 73 | 74 |
| Thermoplastic polyester resin (A) | A-1 | Parts by weight | 100 | 100 | 100 | 100 |
| Thermoplastic polyester resin (A) | A-2 | Parts by weight | — | — | — | — |
| Novolac type epoxy resin (B) represented by formula (1) (X = (2)) | B-1 | Parts by weight | 1.7 | 1.7 | 1.7 | 1.7 |
| Novolac type epoxy resin (B) represented by formula (1) (X = (3)) | B-2 | Parts by weight | — | — | — | — |
| Phosphorus-based stabilizer (C) | C-1 | Parts by weight | 0.3 | 0.3 | 0.3 | 0.3 |
| Monofunctional epoxy compound (D) | D-1 | Parts by weight | 0.3 | 0.3 | 0.3 | 0.3 |
| Amidine compound (E) | E-1 | Parts by weight | 0.122 | 2 | 4 | 6 |

TABLE 11-continued

|  | Designation | Unit | Examples | | | |
|---|---|---|---|---|---|---|
|  |  |  | 71 | 72 | 73 | 74 |
| Blend concentration of epoxy groups derived from (B)/Blend concentration of carboxyl end groups derived from (A) | — | — | 2 | 2 | 2 | 2 |
| Blend concentration of (E)/Blend concentration of epoxy groups derived from (B) | — | — | 0.14 | 2.24 | 4.49 | 6.73 |
| Tensile strength | | MPa | 56 | 55 | 52 | 48 |
| Tensile elongation | | % | 7.34 | 6.93 | 4.48 | 3.98 |
| Heat distortion temperature | | ° C. | 55 | 54 | 53 | 51 |
| Tensile strength retention four days after the heat-moisture treatment | | % | 100 | 97 | 95 | 86 |
| Tensile strength retention eight days after the heat-moisture treatment | | % | 72 | 67 | 61 | 52 |
| Rate of change in melt viscosity index | | % | 8 | 12 | 21 | 29 |
| Degree of yellowing (YI) | | — | 22 | 25 | 26 | 28 |
| Concentration of carboxyl end groups in the resin components in the resin composition | | eq/t | 0 | 0 | 2 | 4 |
| Concentration of epoxy groups in the resin composition | | eq/t | 31 | 28 | 25 | 21 |
| Bleed out | | Visual observation | Good | Good | Good | Good |

TABLE 12

|  | Designation | Unit | Examples | | | |
|---|---|---|---|---|---|---|
|  |  |  | 75 | 76 | 77 | 78 |
| Thermoplastic polyester resin (A) | A-1 | Parts by weight | 100 | 100 | 100 | 100 |
| Novolac type epoxy resin (B) represented by formula (1) (X = (2)) | B-1 | Parts by weight | 1.7 | 1.7 | 1.7 | 1.7 |
| Amidine compound (E) | E-1 | Parts by weight | 0.030 | 0.030 | 0.030 | 0.030 |
| Vinyl resin (F) | F-1 | Parts by weight | 2 | — | — | — |
| Ethylene copolymer (F) | F-2 | Parts by weight | — | 2 | — | — |
| Hindered phenol antioxidant (F) | F-3 | Parts by weight | — | — | 0.2 | — |
| Mold release agent (F) | F-4 | Parts by weight | — | — | — | 0.1 |
| Blend concentration of epoxy groups derived from (B)/Blend concentration of carboxyl end groups derived from (A) | — | — | 2 | 2 | 2 | 2 |
| Blend concentration of (E)/Blend concentration of epoxy groups derived from (B) | — | — | 0.03 | 0.03 | 0.03 | 0.03 |
| Tensile strength | | MPa | 55 | 54 | 56 | 56 |
| Tensile elongation | | % | 7.79 | 7.82 | 7.42 | 7.28 |
| Heat distortion temperature | | ° C. | 58 | 59 | 59 | 59 |
| Tensile strength retention four days after the heat-moisture treatment | | % | 100 | 100 | 100 | 100 |
| Tensile strength retention eight days after the heat-moisture treatment | | % | 90 | 90 | 93 | 91 |
| Rate of change in melt viscosity index | | % | 22 | 20 | 17 | 19 |
| Degree of yellowing (YI) | | — | 35 | 35 | 34 | 34 |
| Concentration of carboxyl end groups in the resin components in the resin composition | | eq/t | 2 | 2 | 2 | 2 |
| Concentration of epoxy groups in the resin composition | | eq/t | 28 | 28 | 28 | 28 |
| Bleed out | | Visual observation | Good | Good | Good | Good |

TABLE 13

|  | Designation | Unit | Examples | | | | | |
| --- | --- | --- | --- | --- | --- | --- | --- | --- |
|  |  |  | 79 | 80 | 81 | 82 | 83 | 84 |
| Thermoplastic polyester resin (A) | A-1 | Parts by weight | 100 | 100 | 100 | 100 | 100 | 100 |
| Novolac type epoxy resin (B) represented by formula (1) (X = (2)) | B-1 | Parts by weight | 1.7 | 1.7 | 1.7 | 1.7 | 1.7 | 1.7 |
| Phosphorus-based stabilizer (C) | C-1 | Parts by weight | 0.3 | 0.3 | 0.3 | 0.3 | 0.3 | 0.3 |
| Monofunctional epoxy compound (D) | D-1 | Parts by weight | 0.3 | 0.3 | 0.3 | 0.3 | 0.3 | 0.3 |
| Amidine compound (E) | E-1 | Parts by weight | 0.030 | 0.030 | 0.030 | 0.030 | 0.030 | 0.030 |
| Vinyl resin (F) | F-1 | Parts by weight | 2 | — | — | — | — | — |
| Ethylene copolymer (F) | F-2 | Parts by weight | — | 2 | — | — | — | — |
| Hindered phenol antioxidant (F) | F-3 | Parts by weight | — | — | 0.2 | — | — | — |
| Mold release agent (F) | F-4 | Parts by weight | — | — | — | 0.1 | — | — |
| Bromine-based flame retardant (F) | F-6 | Parts by weight | — | — | — | — | 15 | — |
| Polyol (F) | F-7 | Parts by weight | — | — | — | — | — | 1 |
| Blend concentration of epoxy groups derived from (B)/Blend concentration of carboxyl end groups derived from (A) | — | — | 2 | 2 | 2 | 2 | 2 | 2 |
| Blend concentration of (E)/Blend concentration of epoxy groups derived from (B) | — | — | 0.03 | 0.03 | 0.03 | 0.03 | 0.03 | 0.03 |
| Tensile strength | — | MPa | 56 | 53 | 55 | 55 | 47 | 55 |
| Tensile elongation | — | % | 7.59 | 7.80 | 7.39 | 7.21 | 6.80 | 7.12 |
| Heat distortion temperature | — | °C. | 58 | 59 | 59 | 59 | 51 | 59 |
| Tensile strength retention four days after the heat-moisture treatment | — | % | 100 | 100 | 100 | 100 | 100 | 100 |
| Tensile strength retention eight days after the heat-moisture treatment | — | % | 93 | 94 | 93 | 94 | 80 | 95 |
| Rate of change in melt viscosity index | — | % | 2 | 3 | 4 | 3 | 10 | 3 |
| Degree of yellowing (YI) | — | — | 19 | 19 | 18 | 18 | 22 | 18 |
| Concentration of carboxyl end groups in the resin components in the resin composition | — | eq/t | 0 | 0 | 0 | 0 | 1 | 0 |
| Concentration of epoxy groups in the resin composition | — | eq/t | 35 | 35 | 35 | 35 | 28 | 38 |
| Bleed out | — | Visual observation | Good | Good | Good | Good | Good | Good |

TABLE 14

|  | Designation | Unit | Comparative Examples | | | |
| --- | --- | --- | --- | --- | --- | --- |
|  |  |  | 1 | 2 | 3 | 4 |
| Thermoplastic polyester resin (A) | A-1 | Parts by weight | 100 | 100 | 100 | 100 |
| Novolac type epoxy resin (B) represented by formula (1) (X = (2)) | B-1 | Parts by weight | 0.04 | — | — | 12.2 |
| Epoxy resin (B') other than our epoxy resin | B'-1 | Parts by weight | — | 1.3 | — | — |
| Epoxy resin (B') other than our epoxy resin | B'-2 | Parts by weight | — | — | 1.4 | — |
| Blend concentration of epoxy groups derived from (B) or (B')/Blend concentration of carboxyl end groups derived from (A) | — | — | 0.05 | 2 | 2 | 14 |
| Tensile strength | — | MPa | 61 | 59 | 59 | 50 |
| Tensile elongation | — | % | 6.28 | 4.52 | 4.47 | 4.09 |
| Heat distortion temperature | — | °C. | 57 | 56 | 55 | 47 |
| Tensile strength retention four days after the heat-moisture treatment | — | % | 0 | 32 | 35 | 65 |
| Rate of change in melt viscosity index | — | % | 57 | 73 | 62 | 48 |
| Degree of yellowing (YI) | — | — | 20 | 25 | 29 | 45 |
| Concentration of carboxyl end groups in the resin components in the resin composition | — | eq/t | 29 | 25 | 23 | 9 |

TABLE 14-continued

|  |  |  | Comparative Examples | | | |
|---|---|---|---|---|---|---|
|  | Designation | Unit | 1 | 2 | 3 | 4 |
| Concentration of epoxy groups in the resin composition | | eq/t | 0 | 35 | 37 | 352 |
| Bleed out | | Visual observation | Good | Good | Good | Poor |

TABLE 15

|  |  |  | Comparative Examples | |
|---|---|---|---|---|
|  | Designation | Unit | 5 | 6 |
| Thermoplastic polyester resin (A) | A-1 | Parts by weight | 100 | 100 |
| Epoxy resin (B') other than our epoxy resin | B'-1 | Parts by weight | 1.3 | — |
| Epoxy resin (B') other than our epoxy resin | B'-2 | Parts by weight | — | 1.4 |
| (F) Glass fiber | F-5 | Parts by weight | 40 | 40 |
| Blend concentration of epoxy groups derived from (B) or (B')/Blend concentration of carboxyl end groups derived from (A) | — | | 2 | 2 |
| Tensile strength | | MPa | 148 | 149 |
| Tensile elongation | | % | 3.85 | 3.78 |
| Heat distortion temperature | | °C. | 213 | 213 |
| Tensile strength retention four days after the heat-moisture treatment | | % | 74 | 76 |
| Tensile strength retention eight days after the heat-moisture treatment | | % | 38 | 42 |
| Rate of change in melt viscosity index | | % | 64 | 55 |
| Degree of yellowing (YI) | | — | 25 | 27 |
| Concentration of carboxyl end groups in the resin components in the resin composition | | eq/t | 22 | 21 |
| Concentration of epoxy groups in the resin composition | | eq/t | 36 | 37 |
| Bleed out | | Visual observation | Good | Good |

TABLE 16

|  |  |  | Comparative Examples | | | |
|---|---|---|---|---|---|---|
|  | Designation | Unit | 7 | 8 | 9 | 10 |
| Thermoplastic polyester resin (A) | A-1 | Parts by weight | 100 | 100 | 100 | 100 |
| Novolac type epoxy resin (B) represented by formula (1) (X = (2)) | B-1 | Parts by weight | 0.04 | — | — | 12.2 |
| Epoxy resin (B') other than our epoxy resin | B'-1 | Parts by weight | — | 1.3 | — | — |
| Epoxy resin (B') other than our epoxy resin | B'-2 | Parts by weight | — | — | 1.4 | — |
| Amidine compound (E) | E-1 | Parts by weight | 0.030 | 0.030 | 0.030 | 0.030 |
| Blend concentration of epoxy groups derived from (B) or (B')/Blend concentration of carboxyl end groups derived from (A) | — | | 0.05 | 2 | 2 | 14 |
| Blend concentration of (E)/Blend concentration of epoxy groups derived from (B) or (B') | — | | 1.43 | 0.03 | 0.03 | 0.005 |
| Tensile strength | | MPa | 56 | 57 | 57 | 54 |
| Tensile elongation | | % | 6.69 | 7.37 | 7.29 | 3.98 |
| Heat distortion temperature | | °C. | 63 | 59 | 59 | 44 |
| Tensile strength retention four days after the heat-moisture treatment | | % | 38 | 90 | 93 | 100 |

TABLE 16-continued

|  | Designation | Unit | Comparative Examples | | | |
|---|---|---|---|---|---|---|
|  |  |  | 7 | 8 | 9 | 10 |
| Tensile strength retention eight days after the heat-moisture treatment | | % | 0 | 39 | 46 | 95 |
| Rate of change in melt viscosity index | | % | 63 | 89 | 63 | 38 |
| Degree of yellowing (YI) | | — | 20 | 25 | 29 | 47 |
| Concentration of carboxyl end groups of in resin components in the resin composition | | eq/t | 27 | 9 | 11 | 0 |
| Concentration of epoxy groups in the resin composition | | eq/t | 0 | 19 | 23 | 341 |
| Bleed out | | Visual observation | Good | Good | Good | Poor |

As can be seen from the comparison of Examples 1 to 7 with Comparative Examples 1 and 4, and the comparison of Examples 10, 13, and 22 to 25 with Comparative Examples 7 and 10, materials with an excellent balance between the hydrolysis resistance, heat resistance, prevention of bleed-out, and retention stability were obtained, when the blending amount of the component (B) was within a specific range.

As can be seen from the comparison of Examples 2 and 3 with Comparative Examples 2 and 3, the comparison of Examples 8 and 9 with Comparative Examples 5 and 6, and the comparison of Examples 13 and 15 with Comparative Examples 8 and 9, by using the novolac type epoxy resin (B) represented by formula (1), a better hydrolysis resistance was obtained while retaining the retention stability, as compared to when other types of epoxy resin were used.

As can be seen from the comparison of Example 2 with Examples 31 and 35 to 40, materials with an excellent color were obtained when 0.01 to 1 part by weight of the phosphorus-based stabilizer (C) was included.

As can be seen from the comparison of Example 31 with Examples 43 and 46 to 49, the retention stability and the long-term hydrolysis resistance were further improved when 0.01 to 1 part by weight of the monofunctional epoxy compound (D) was included.

As can be seen from the comparison of Example 2 with Examples 11 to 13, 19 to 21, and 26 to 29, and the comparison of Example 43 with Examples 54 to 56, 64 to 66, and 71 to 74, materials with an excellent balance between the mechanical properties and the long-term hydrolysis resistance were obtained when 0.001 to 5 parts by weight of the reaction catalyst (E) were included. Further, as can be seen from the comparison of Examples 19 to 25, and the comparison of Examples 64 to 70, when the ratio of the blend concentration of the reaction catalyst (E) in the composition to the concentration of the epoxy groups derived from the novolac type epoxy resin (B) in the composition was 0.01 to 0.1, a particularly excellent balance between the mechanical properties and the long-term hydrolysis resistance was obtained.

As can be seen from the comparison of Examples 13, and 16 to 18, and the comparison of Example 56, and 59 to 61, materials with a particularly excellent long-term hydrolysis resistance were obtained, when an amidine compound was used as the component (E).

As can be seen from the comparison of Examples 8 to 9, 50 to 52, and 75 to 84, it was possible to add other additives to the resin composition without compromising the desired effect.

The invention claimed is:
1. A thermoplastic polyester resin composition comprising 100 parts by weight of a thermoplastic polyester resin (A), and 0.1 to 10 parts by weight of a novolac type epoxy resin (B) represented by formula (1);

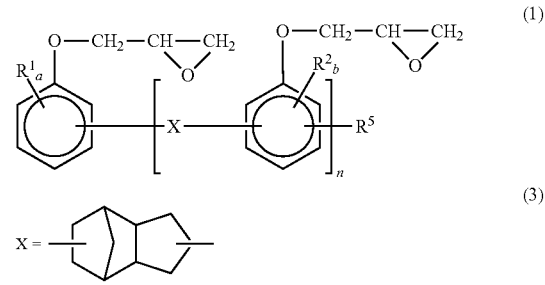

wherein, in formula (1), X represents a divalent group represented by formula (3) shown above;
wherein, in formula (1), $R^1$ to $R^2$ each independently represents an alkyl group having from 1 to 8 carbon atoms or an aryl group having from 6 to 10 carbon atoms, and they may be the same or different from each other; and $R^5$ represents a hydrogen atom, an alkyl group having from 1 to 8 carbon atoms, or an aryl group having from 6 to 10 carbon atoms;
in formula (1), n represents a value of 2 to 10;
in formula (1), a represents a value of 0 to 4, and b represents a value of 0 to 3, and wherein a ratio (the blend concentration of epoxy groups/the blend concentration of carboxyl end groups) of the blend concentration (eq/g) of the epoxy groups derived from the novolac type epoxy resin (B) represented by formula (1) to the blend concentration (eq/g) of the carboxyl end groups derived from the thermoplastic polyester resin (A), in the thermoplastic polyester resin composition, is 1 to 8,
the thermoplastic polyester resin (A) is a polymer or a copolymer comprising as main structural units a residue of an aromatic dicarboxylic acid or an ester-forming derivative thereof and a residue of an aliphatic diol or an ester-forming derivative thereof, and
the thermoplastic polyester resin (A) consists of a polymer or a copolymer selected from the group consisting of polyethylene terephthalate, polypropylene terephthalate, polybutylene terephthalate, polycyclohexane dimethylene terephthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate and polybutylene terephthalate/naphthalate.

2. The thermoplastic polyester resin composition according to claim 1, wherein the concentration of the carboxyl end groups with respect to the amount of the thermoplastic polyester resin (A) in the thermoplastic polyester resin composition is 20 eq/t or less.

3. The thermoplastic polyester resin composition according to claim 1, wherein the concentration of the epoxy groups in the thermoplastic polyester resin composition is 5 eq/t or more.

4. The thermoplastic polyester resin composition according to claim 1, further comprising a phosphorus-based stabilizer (C) in an amount of 0.01 to 1 part by weight with respect to 100 parts by weight of the thermoplastic polyester resin (A).

5. The thermoplastic polyester resin composition according to claim 1, further comprising a monofunctional epoxy compound (D) in an amount of 0.01 to 1 part by weight with respect to 100 parts by weight of the thermoplastic polyester resin (A).

6. The thermoplastic polyester resin composition according to claim 1, further comprising a reaction catalyst (E) in an amount of 0.001 to 5 parts by weight with respect to 100 parts by weight of the thermoplastic polyester resin (A).

7. The thermoplastic polyester resin composition according to claim 6, wherein a ratio (the blend concentration of the reaction catalyst/the blend concentration of the epoxy groups) of the blend concentration (mol/g) of the reaction catalyst (E) to the blend concentration (eq/g) of the epoxy groups derived from the novolac type epoxy resin (B) represented by formula (1), in the thermoplastic polyester resin composition, is 0.01 to 0.1.

8. The thermoplastic polyester resin composition according to claim 6, wherein the reaction catalyst (E) contains a compound containing nitrogen or phosphorus.

9. The thermoplastic polyester resin composition according to claim 6, wherein the reaction catalyst (E) contains an amidine compound.

10. A molded article obtained by melt-molding the thermoplastic polyester resin composition according to claim 1.

11. The thermoplastic polyester resin composition according to claim 1, wherein the thermoplastic polyester resin (A) consists of a polymer or a copolymer selected from the group consisting of polybutylene terephthalate, polyethylene terephthalate, polypropylene terephthalate, polyethylene naphthalate, and polycyclohexane dimethylene terephthalate.

12. The thermoplastic polyester resin composition according to claim 1, wherein the thermoplastic polyester resin (A) consists of polybutylene terephthalate.

* * * * *